US012643653B2

(12) United States Patent
Mellor

(10) Patent No.: US 12,643,653 B2
(45) Date of Patent: Jun. 2, 2026

(54) MECHANICAL PROGRAMMING SYSTEM AND METHOD FOR CONTROLLING THE ORIENTATION OF A DOOR

(71) Applicant: The Boeing Company, Arlington, VA (US)

(72) Inventor: Mitchell Mellor, Bothell, WA (US)

(73) Assignee: The Boeing Company, Arlington, VA (US)

( * ) Notice: Subject to any disclaimer, the term of this patent is extended or adjusted under 35 U.S.C. 154(b) by 97 days.

(21) Appl. No.: 18/639,765

(22) Filed: Apr. 18, 2024

(65) Prior Publication Data

US 2025/0327350 A1 Oct. 23, 2025

(51) Int. Cl.
| | |
|---|---|
| *B64C 1/14* | (2006.01) |
| *E05D 15/30* | (2006.01) |
| *E05D 15/34* | (2006.01) |
| *E05F 3/02* | (2006.01) |

(52) U.S. Cl.
CPC ............ *B64C 1/143* (2013.01); *B64C 1/1407* (2013.01); *E05D 15/30* (2013.01); *E05D 15/34* (2013.01); *E05F 3/02* (2013.01); *E05Y 2900/502* (2013.01); *E05Y 2900/531* (2013.01)

(58) Field of Classification Search
CPC ..... B64C 1/143; B64C 1/1407; B64C 1/1461; B64C 1/1423; E05D 3/18; E05D 15/04; E05D 15/30; E05D 15/34; E05F 3/02; E05F 15/60
See application file for complete search history.

(56) References Cited

U.S. PATENT DOCUMENTS

| | | | | |
|---|---|---|---|---|
| 3,791,073 | A * | 2/1974 | Baker | B64C 1/143 |
| | | | | 49/40 |
| 4,199,120 | A * | 4/1980 | Bergman | B64C 1/143 |
| | | | | 244/129.5 |
| 4,375,877 | A | 3/1983 | Shorey | |
| 4,715,562 | A | 12/1987 | Bokalot | |
| 4,720,065 | A * | 1/1988 | Hamatani | B64C 1/143 |
| | | | | 244/905 |
| 4,854,010 | A | 8/1989 | Maraghe | |
| 5,289,615 | A * | 3/1994 | Banks | E05D 3/122 |
| | | | | 244/905 |
| 5,305,969 | A * | 4/1994 | Odell | B64C 1/1407 |
| | | | | 292/259 R |
| 5,379,971 | A | 1/1995 | Kim | |
| 7,357,354 | B2 * | 4/2008 | Mortland | B64C 1/1407 |
| | | | | 244/129.4 |

(Continued)

*Primary Examiner* — Justin B Rephann

(57) ABSTRACT

A mechanical programming system for a door has at least one track and at least two links. The track is formed in an arm coupling the door to a door opening in a body. The links are pivotably connected in series between an arm-body interface and an arm-door interface, and transmit rotational motion of the arm about an arm-body hinge axis to the door for rotation about an arm-door hinge axis. At least one link is coupled to the track via a track engaging element. The track has a directional path shape that causes an orientation of at least one link to change as the track engaging element slides along the track in a manner maintaining the door parallel to the door opening during an opening sequence of translating the door from a closed position to an open position while allowing non-parallel orientations of the door during the opening sequence.

20 Claims, 26 Drawing Sheets

(56)  References Cited

U.S. PATENT DOCUMENTS

| | | | | |
|---|---|---|---|---|
| 7,735,199 | B2 * | 6/2010 | Clausen | E05D 3/127 |
| | | | | 244/129.4 |
| 8,082,630 | B2 | 12/2011 | Sprague | |
| 9,630,700 | B2 * | 4/2017 | Kammerer | B64C 1/1407 |
| 11,512,512 | B2 * | 11/2022 | Means | E05D 7/009 |
| 11,597,493 | B2 * | 3/2023 | Gildas | E05F 7/02 |
| 11,661,167 | B2 * | 5/2023 | Buchet | E05C 9/08 |
| | | | | 244/129.5 |
| 11,691,710 | B2 * | 7/2023 | Beezhold | B64C 1/143 |
| | | | | 244/129.5 |
| 11,920,386 | B2 * | 3/2024 | Dubosc | B64C 1/143 |
| 12,043,366 | B2 * | 7/2024 | Capron | E05D 3/06 |
| 12,163,365 | B2 * | 12/2024 | Mortland | E05D 3/06 |
| 2002/0096602 | A1 | 7/2002 | Dazet | |
| 2005/0178601 | A1 * | 8/2005 | Galvani | E05D 3/127 |
| | | | | 180/271 |
| 2006/0202087 | A1 * | 9/2006 | Mortland | B64C 1/1407 |
| | | | | 244/129.5 |
| 2008/0276428 | A1 * | 11/2008 | Clausen | E05D 3/122 |
| | | | | 16/354 |
| 2021/0323654 | A1 | 10/2021 | Gildas | |
| 2021/0323655 | A1 | 10/2021 | Gildas | |
| 2021/0332624 | A1 * | 10/2021 | Means | E05D 7/009 |
| 2025/0084672 | A1 * | 3/2025 | Mellor | B64C 1/143 |

* cited by examiner

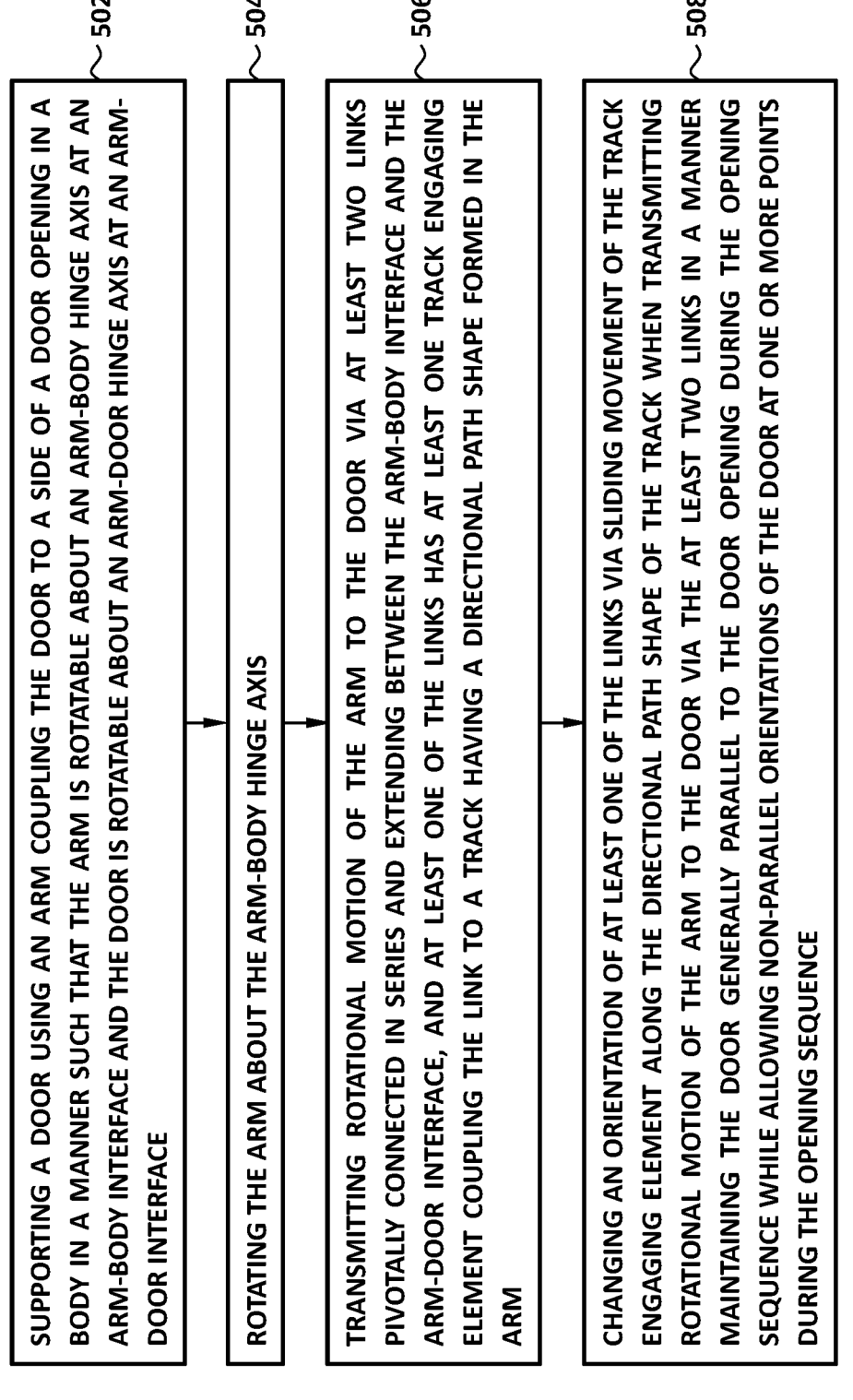

500

502 — SUPPORTING A DOOR USING AN ARM COUPLING THE DOOR TO A SIDE OF A DOOR OPENING IN A BODY IN A MANNER SUCH THAT THE ARM IS ROTATABLE ABOUT AN ARM-BODY HINGE AXIS AT AN ARM-BODY INTERFACE AND THE DOOR IS ROTATABLE ABOUT AN ARM-DOOR HINGE AXIS AT AN ARM-DOOR INTERFACE

504 — ROTATING THE ARM ABOUT THE ARM-BODY HINGE AXIS

506 — TRANSMITTING ROTATIONAL MOTION OF THE ARM TO THE DOOR VIA AT LEAST TWO LINKS PIVOTALLY CONNECTED IN SERIES AND EXTENDING BETWEEN THE ARM-BODY INTERFACE AND THE ARM-DOOR INTERFACE, AND AT LEAST ONE OF THE LINKS HAS AT LEAST ONE TRACK ENGAGING ELEMENT COUPLING THE LINK TO A TRACK HAVING A DIRECTIONAL PATH SHAPE FORMED IN THE ARM

508 — CHANGING AN ORIENTATION OF AT LEAST ONE OF THE LINKS VIA SLIDING MOVEMENT OF THE TRACK ENGAGING ELEMENT ALONG THE DIRECTIONAL PATH SHAPE OF THE TRACK WHEN TRANSMITTING ROTATIONAL MOTION OF THE ARM TO THE DOOR VIA THE AT LEAST TWO LINKS IN A MANNER MAINTAINING THE DOOR GENERALLY PARALLEL TO THE DOOR OPENING DURING THE OPENING SEQUENCE WHILE ALLOWING NON-PARALLEL ORIENTATIONS OF THE DOOR AT ONE OR MORE POINTS DURING THE OPENING SEQUENCE

FIG. 33

MECHANICAL PROGRAMMING SYSTEM AND METHOD FOR CONTROLLING THE ORIENTATION OF A DOOR

FIELD

The present disclosure relates generally to translating doors and, more specifically, to a mechanical programming system for controlling the orientation of a door during translation between a closed position and an open position.

BACKGROUND

Many commercial airplanes have passenger entry doors that open via a translating motion. Such translating doors are typically coupled to the fuselage by a double-acting hinge arm. The hinge arm is attached to the fuselage at an arm-fuselage interface, and to the door at an arm-door interface. A mechanical programming system controls (i.e., programs) the orientation of the door relative to the hinge arm such that the door remains generally parallel to the fuselage during opening and closing of the door.

Known examples of mechanical programming systems for translating doors include parallel bars programing, which comprises two or more parallel bars mounted on separate axes to create a parallelogram with the fuselage and the door. Although suitable for its intended purpose, parallel bars programing requires mounting the parallel bars at the top of the door above the doorway opening. The mounting of the parallel bars requires structural interfaces at the door opening and door, which adds weight and complexity to the aircraft. Furthermore, in order to function properly, the parallel bars require additional space that protrudes outside the envelope of the hinge arm.

Another example of a mechanical programming system is rack and pinion programming in which a rack is mounted to the arm (i.e., the hinge arm). The rack slides along the arm as the door opens. Pinion gears mounted on the door and fuselage rotate as the door opens. Although the arrangement works well, rack and pinion programming requires that the rack and pinion gears are large enough to transmit the torque between the arm-door interface and the arm-fuselage interface. The large size of the rack and pinion gears adds weight. In addition, the gear teeth must be formed of hardened material which increases cost.

A further example of a mechanical programming system is chain drive programing in which a sprocket is fixed to the door and another sprocket is fixed to the fuselage. A chain, similar to a bicycle chain, wraps around both sprockets in a manner such that rotation of the arm relative to the fuselage at the arm-fuselage interface causes the same amount of rotation of the door relative to the arm at the arm-door interface. Although chain drive programing works well, the system requires the mounting of idler rollers at different locations on the arm to conform the chain to the angled profile shape of the arm. The sprocket teeth must be formed of hardened material which increases cost. In addition, the sprockets and chain must be large enough to transmit the torque between the arm-door interface and the arm-fuselage interface, which adds weight to the aircraft.

As can be seen, there exists a need in the art for a mechanical programming system for a translating door that avoids the above-noted drawbacks associated with conventional mechanical programming systems.

SUMMARY

The above-noted needs associated with mechanical programming systems are addressed by the present disclosure, which provides a mechanical programming system for a door. The mechanical programming system includes at least one track formed in an arm configured to couple the door to a side of a door opening in a body in a manner such that the arm is rotatable about an arm-body hinge axis at an arm-body interface and the door is rotatable about an arm-door hinge axis at an arm-door interface. The mechanical programming system further includes at least two links pivotably connectable in series and extendable between the arm-body interface and the arm-door interface and configured to transmit rotational motion of the arm about the arm-body hinge axis to the door for rotation about the arm-door hinge axis. At least one of the links has at least one track engaging element configured to couple the link to the track. The track has a directional path shape configured to cause an orientation of at least one of the links to change as the track engaging element slides along the track in a manner maintaining the door generally parallel to the door opening during an opening sequence of translating the door from a closed position to an open position while allowing non-parallel orientations of the door at one or more points during the opening sequence.

Also disclosed is an aircraft having a fuselage. The fuselage has a door opening and a cabin door. In addition, the aircraft has an arm coupling the cabin door to a side of the door opening in a manner such that the arm is rotatable about an arm-body hinge axis at an arm-body interface and the cabin door is rotatable about an arm-door hinge axis at an arm-door interface. The aircraft also includes a mechanical programming system having at least one track and at least two links. The track is formed in the arm. The links are pivotably connected in series and extend between the arm-body interface and the arm-door interface. The links are configured to transmit rotational motion of the arm about the arm-body hinge axis to the cabin door for rotation about the arm-door hinge axis. At least one link has at least one track engaging element configured to engage the link with the track. The track has a directional path shape configured to cause an orientation of at least one of the links to change as the track engaging element slides along the track in a manner maintaining the cabin door generally parallel to the door opening during an opening sequence of translating the cabin door from a closed position to an open position while allowing non-parallel orientations of the cabin door at one or more points during the opening sequence.

Also disclosed is a method of controlling the orientation of a door relative to a body during an opening sequence of translating the door from a closed position to an open position. The method includes supporting a door using an arm coupling the door to a side of a door opening in a body in a manner such that the arm is rotatable about an arm-body hinge axis at an arm-body interface and the door is rotatable about an arm-door hinge axis at an arm-door interface. The method also includes rotating the arm about the arm-body hinge axis. In addition, the method includes transmitting rotational motion of the arm to the door via at least two links pivotally connected in series and extending between the arm-body interface and the arm-door interface, and at least one of the links has at least one track engaging element coupling the link to a track having a directional path shape formed in the arm. Furthermore the method includes changing the orientation of at least one of the links via sliding movement of the track engaging element along the directional path shape of the track when transmitting rotational motion of the arm to the door via the at least two links in a manner maintaining the door generally parallel to the door opening during the opening sequence while allowing non-parallel orientations of the door at one or more points during the opening sequence.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 33 is a flowchart of a method of controlling the orientation of a door relative to a body during an opening sequence in which the door is translated from a closed position to an open position.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
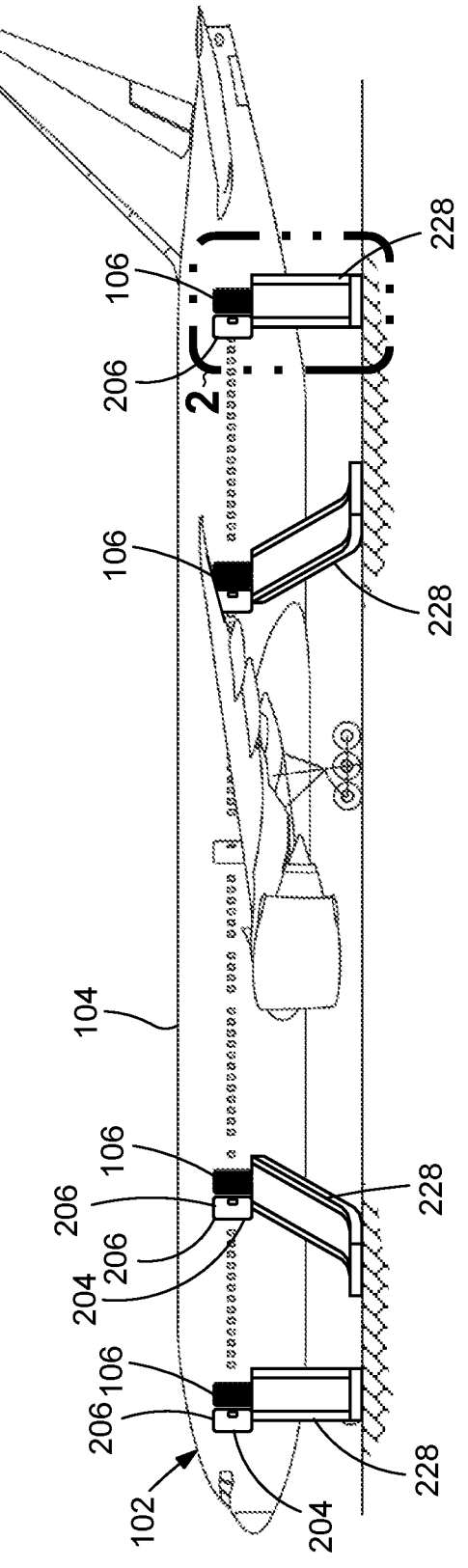
FIG. 1 is a side view of an example of an aircraft having multiple passenger entry doors (i.e., emergency egress doors), each of which is shown in an open position and each of which has an inflatable escape slide deployed from a door lower portion of the door.
Figure 2:
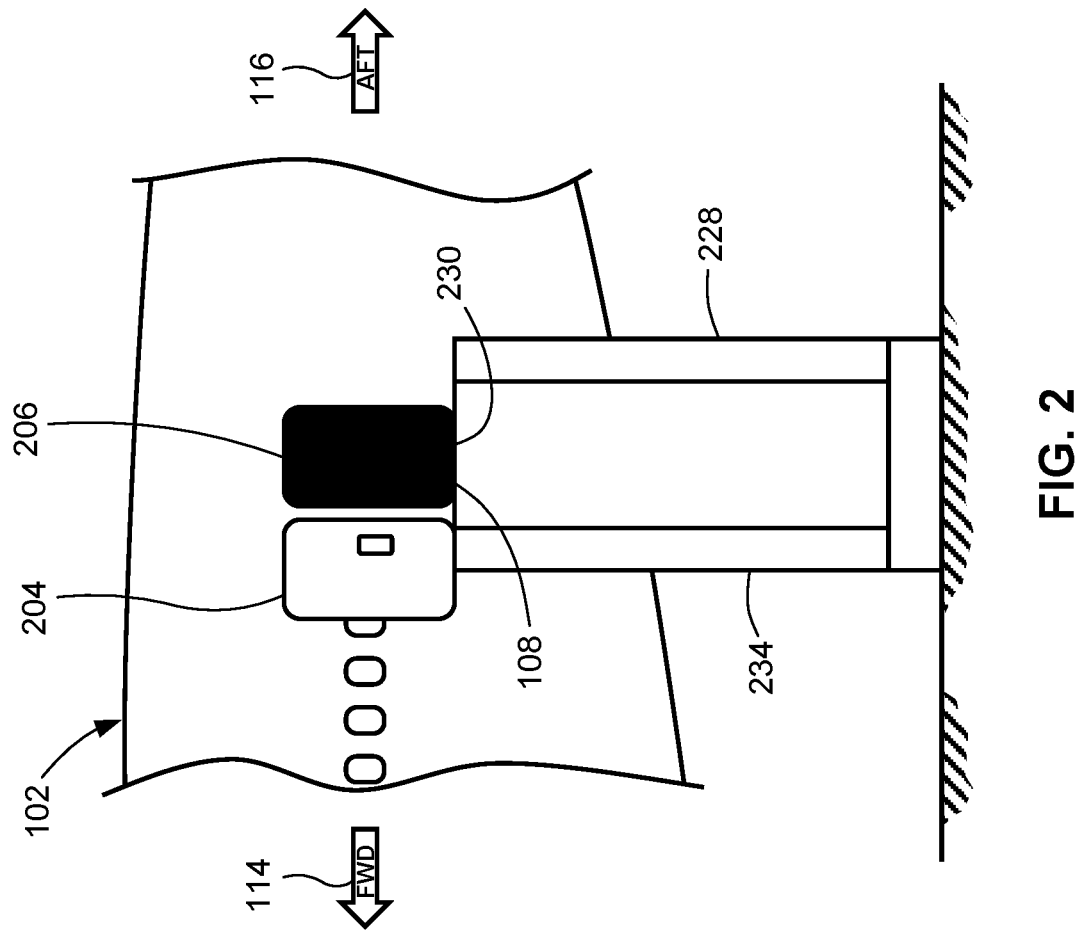
FIG. 2 is a magnified view of one of the emergency egress doors of FIG. 1 showing an escape slide in the deployed configuration.

Referring now to the drawings which illustrate various examples of the disclosure, shown in FIG. 1 is an example of an aircraft 102 having a fuselage 104 with multiple door openings 106 and a door 206 (e.g., a cabin door such as an emergency egress door) for each door opening 106. In FIG. 1, each door 206 is in the open position 204 and an inflatable escape slide 228 is deployed from each door 206. FIG. 2 is a magnified view of a portion of the aircraft 102 of FIG. 1 showing one of the doors 206 in the open position 204 and showing an example of an escape slide 228 in the deployed configuration 234. The escape slide 228 has a slide upper portion 230 that is attached to a door sill 108 at the bottom of the door opening 106.

Figure 3:
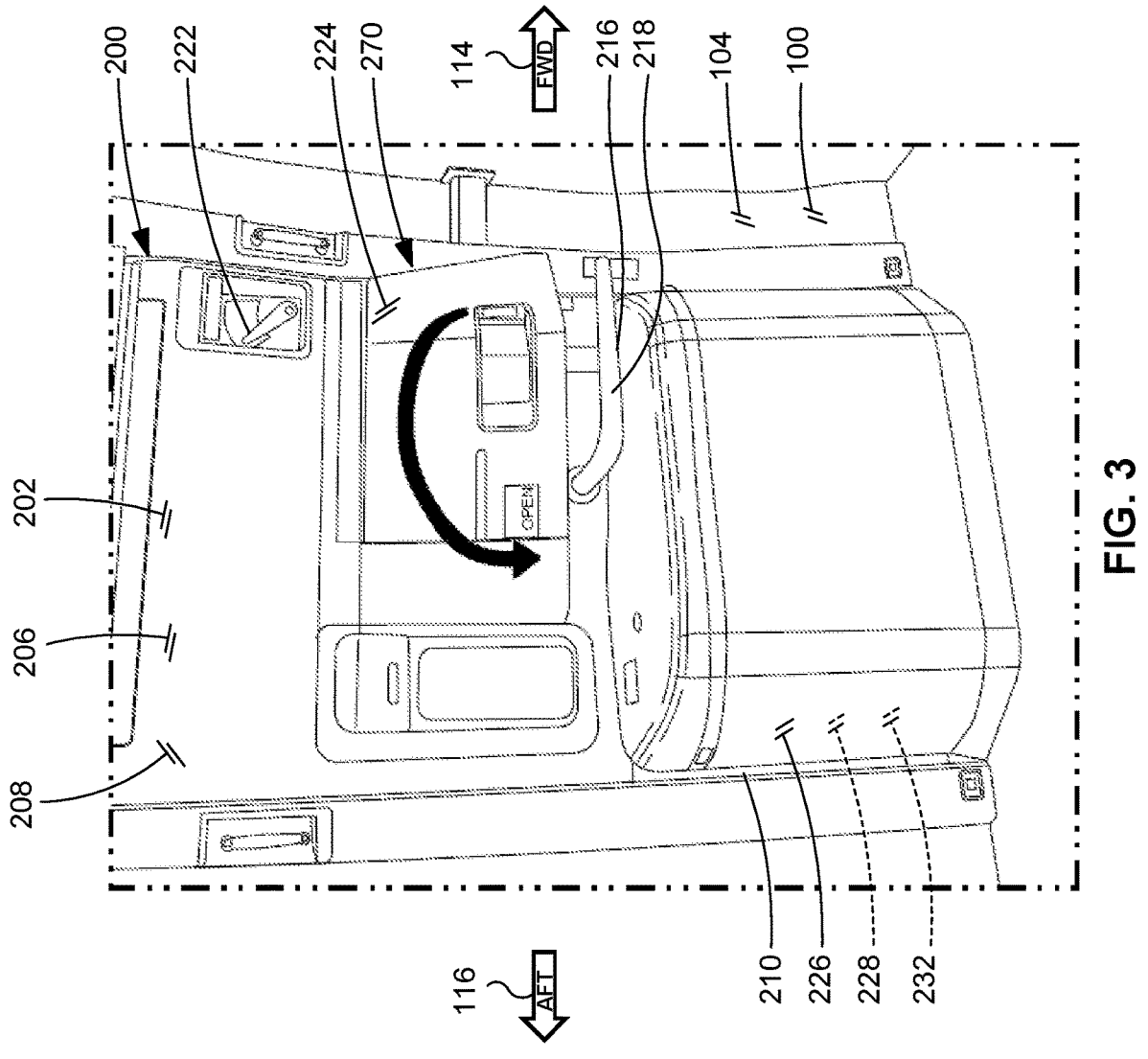
FIG. 3 is an outboard-looking perspective view of an example of an emergency egress door in the closed position and which is supported by the presently-disclosed door mechanism, and further illustrating a slide bustle mounted to the door lower portion for containing an inflatable escape slide.

Referring to FIG. 3, shown is an outboard-looking view of an example of a door 206 in the closed position 202. The door 206 is supported by a door mechanism 270, which is part of a door assembly 200 that includes an inflatable escape slide 228 mounted in a stowed configuration 232 within a slide bustle 226 on the inboard 110 side of the door lower portion 210 of the door 206. The door mechanism 270 includes an arm 272 (FIG. 4) that couples the door 206 to the fuselage 104. In addition, the door mechanism 270 includes the presently-disclosed mechanical programming system 400 for controlling (i.e., programming) desired orientations of the door 206 (e.g., an emergency egress door) relative to a body 100 (e.g., a fuselage 104) during translation of the door 206 between the closed position 202 (FIGS. 15-18) and the open position 204 (FIGS. 24-28). The mechanical programming system 400 is configured to maintain the door 206 generally parallel to the door opening 106 during an opening sequence in which the door 206 is translated from the closed position 202 to the open position 204 while allowing non-parallel orientations of the door 206 at one or more points during the opening sequence, as described in greater detail below.

In the example shown, the door 206 moves in a forward 114 direction (FIGS. 3-4) of the aircraft 102 when translating from the closed position 202 to the open position 204. However, in other examples not shown, the door mechanism 270 can be configured to move the door 206 in an aft 116 direction when translating from the closed position 202 to the open position 204. Furthermore, although the mechanical programming system 400 is described in the context of an emergency egress door 206 of an aircraft 102, the mechanical programming system 400 can be implemented on any type of door 206 that is supported by a double-acting hinge arm. In this regard, the terms "door," "cabin door," and "emergency egress door" are used interchangeably in the present disclosure.

In FIG. 3, the door assembly 200 includes a door operating handle 216 that is rotatable approximately 180 degrees between a closed orientation 218 and an open orientation (not shown). When the door operating handle 216 is in the closed orientation 218, the door 206 is essentially locked in the closed position 202. Moving the door operating handle 216 to the open orientation moves the door 206 in an initially generally upward direction to a height at which the door 206 can then be moved (e.g., via a member of the aircraft crew) in an outboard 112 direction toward the open position 204, as described in greater detail below.

In the example shown, the door assembly 200 includes a door mode selector handle 222 for arming the door 206 when in the closed position 202. In this regard, the slide upper portion 230 (FIG. 3) of the stowed escape slide 228 has a girt bar (not shown) that engages with the door sill 108 (FIG. 3) when the door mode selector handle 222 is moved to the armed position. In the event of an emergency, the escape slide 228 will deploy and inflate when the door 206 is opened.

Figure 4:
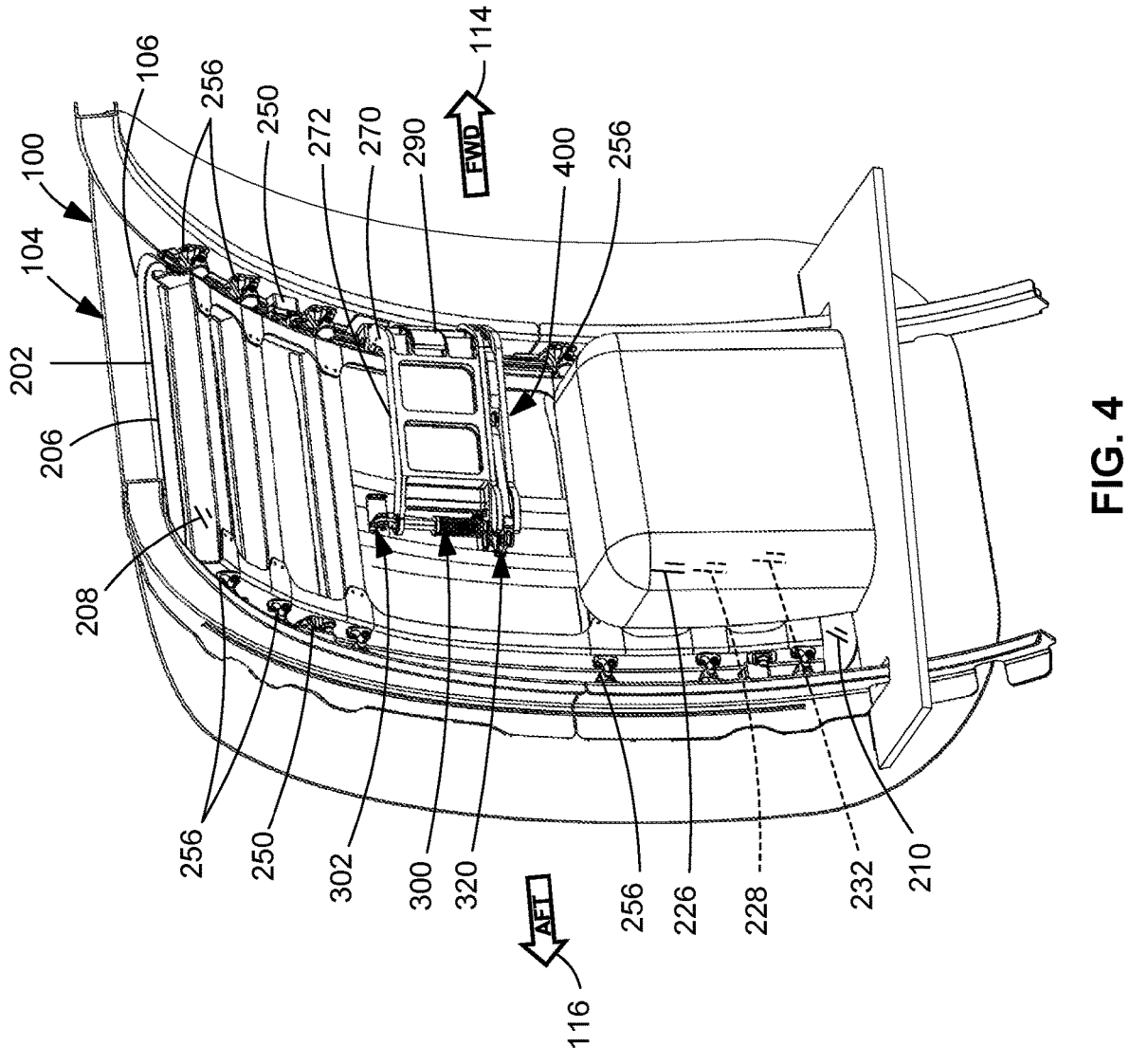
FIG. 4 is an outboard-looking perspective view of the components of an emergency egress door in the closed position and which is shown coupled to the fuselage via a door mechanism having a mechanical programming system configured to control the orientation of the door relative to the arm in a manner maintaining the door generally parallel to the door during an opening sequence of translating the door from a closed position to an open position while allowing non-parallel orientations of the door at one or more points during the opening sequence.
Figure 5:
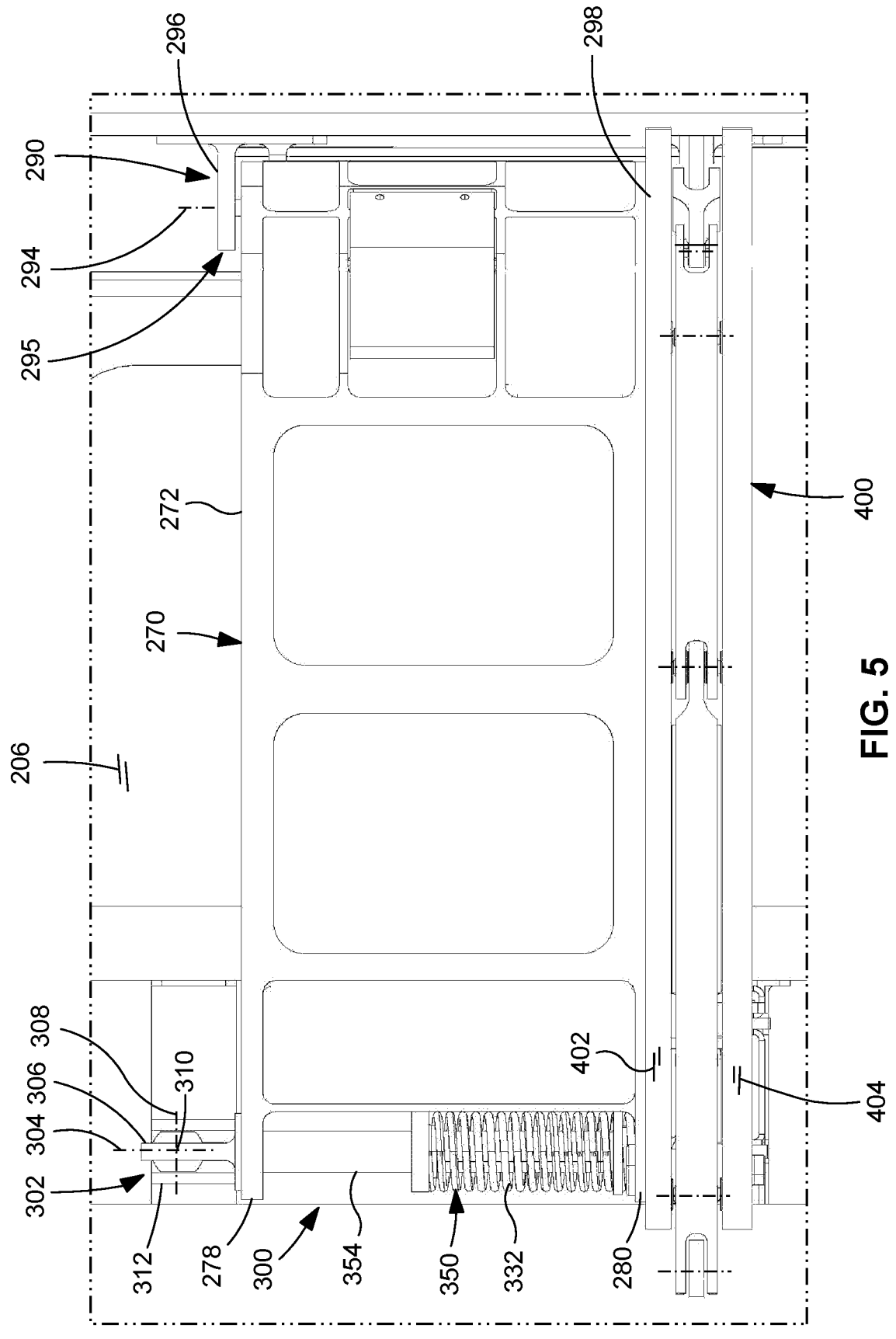
FIG. 5 is an outboard-looking view of the door mechanism of FIG. 4 showing the arm coupling the door to the fuselage.
Figure 6:
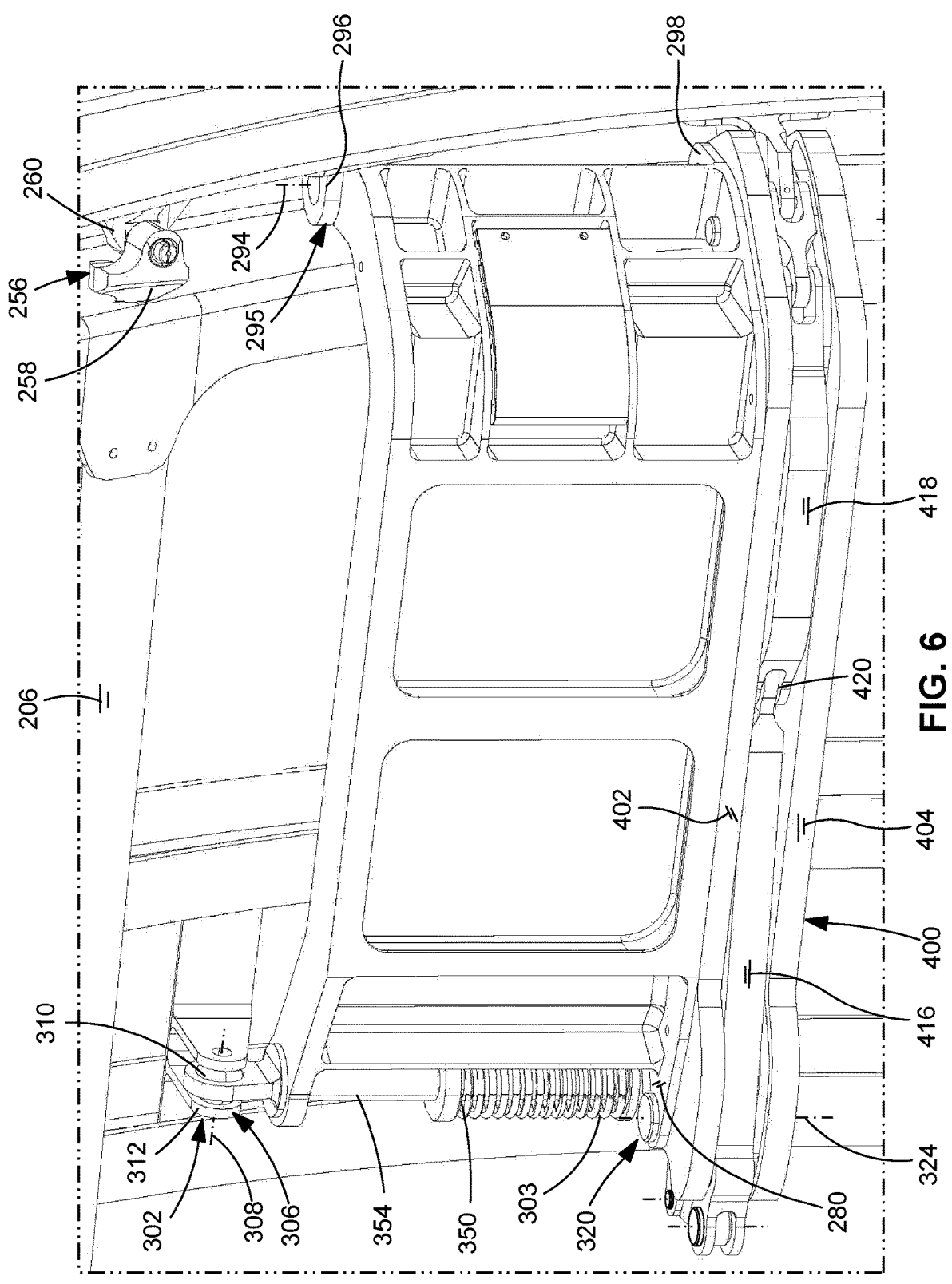
FIG. 6 is a perspective view of the door mechanism showing the arm-body interface (i.e., arm-fuselage interface) where the arm is coupled to the fuselage.
Figure 7:
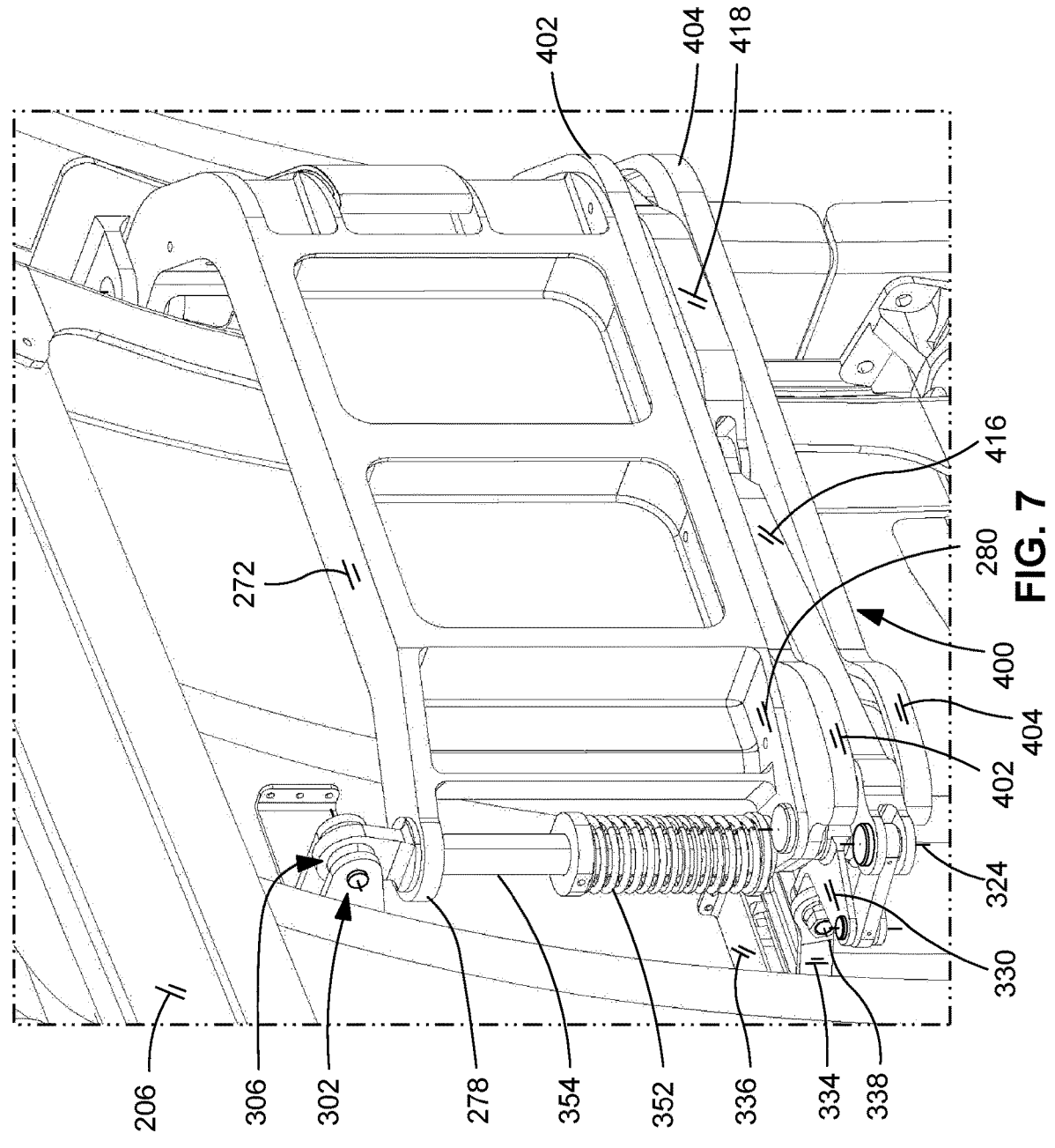
FIG. 7 is a perspective view of the door mechanism showing the arm-door interface where the arm is coupled to the door via an arm-door upper joint and an arm-door lower joint.
Figure 8:
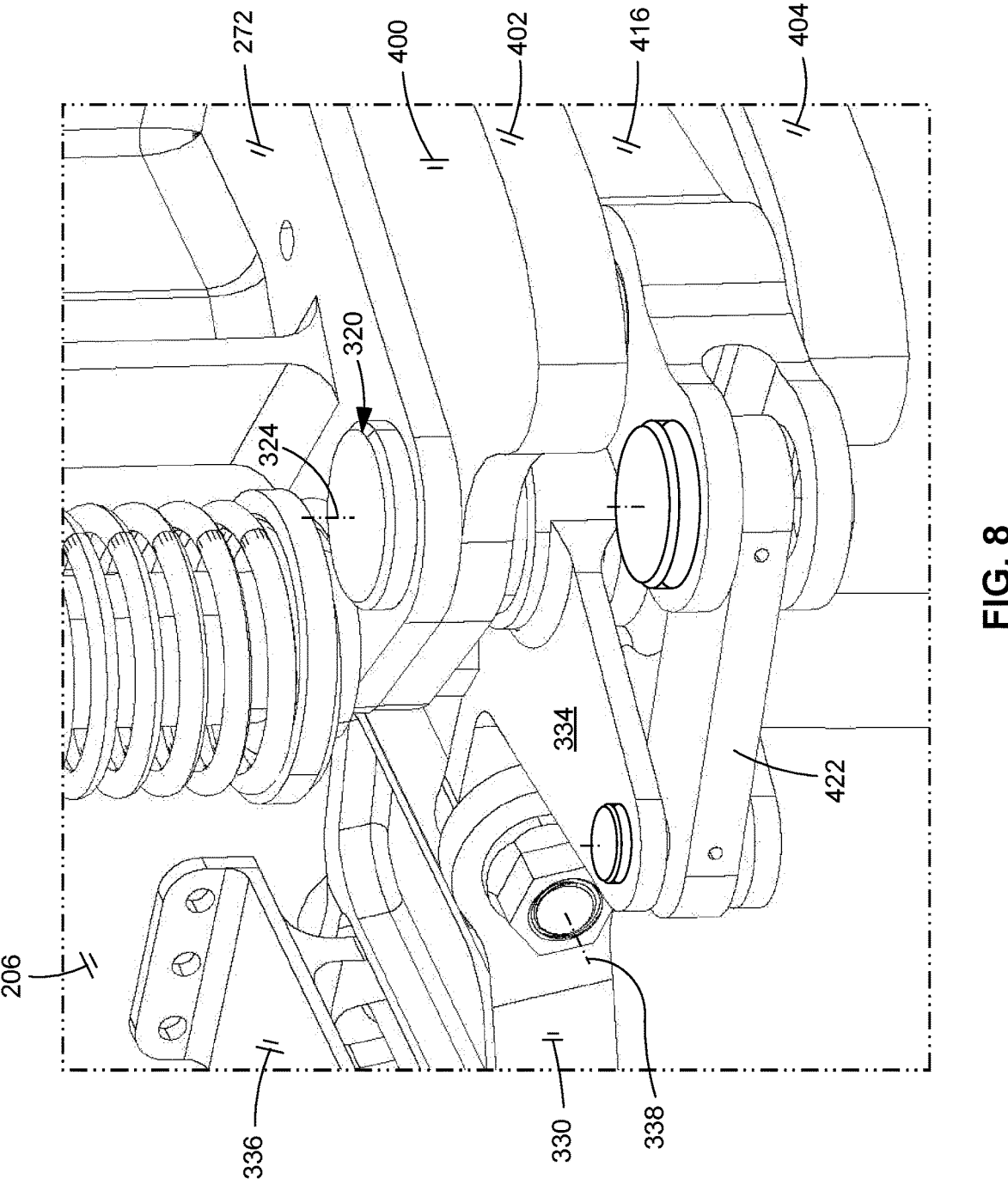
FIG. 8 is a magnified view of the arm-door lower joint.
Figure 9:
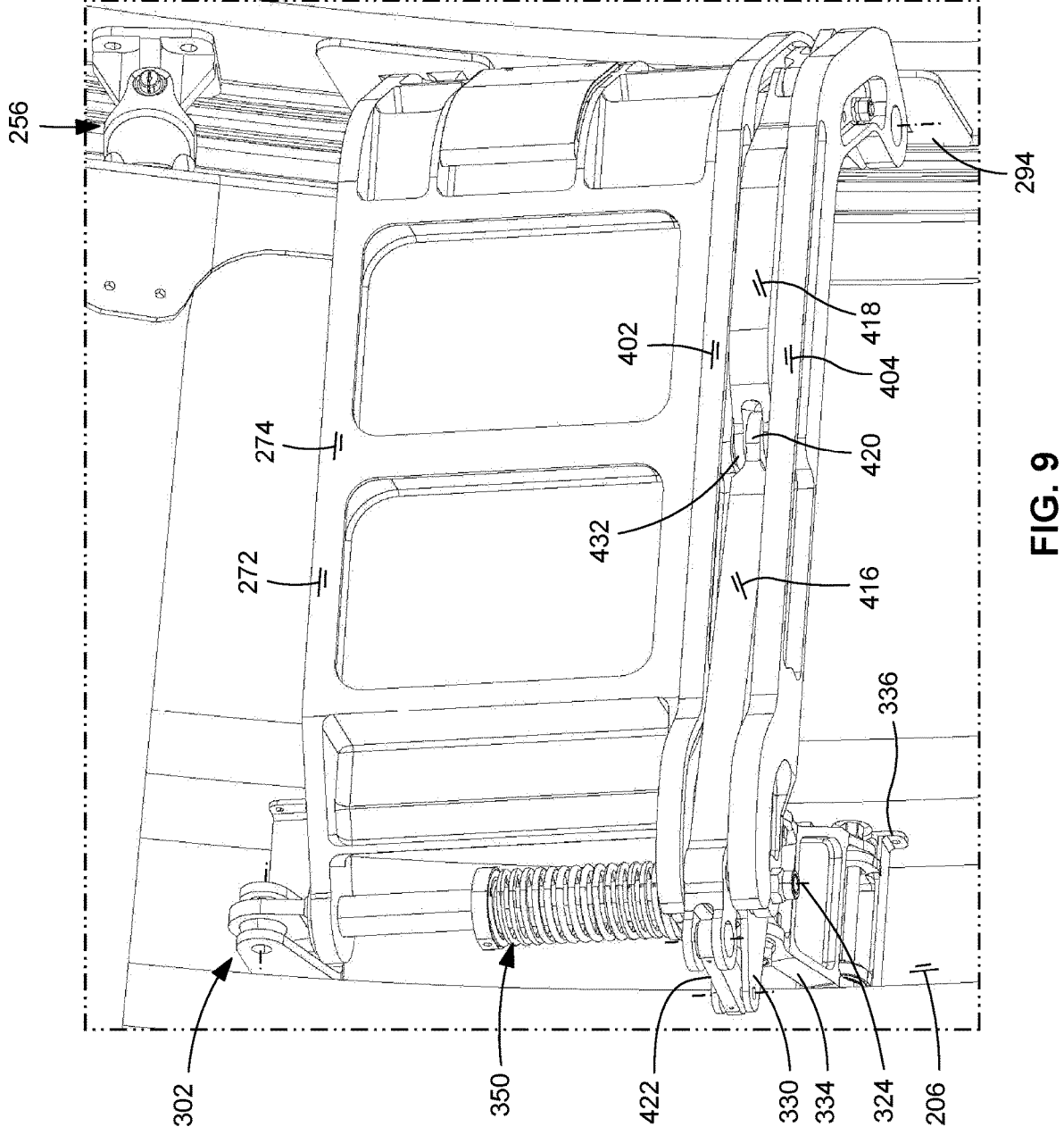
FIG. 9 is a perspective view of an example of the presently disclosed mechanical programming system located on the underside of the arm.

Referring to FIGS. 4-14, shown in FIG. 4 is an outboard-looking view of the door 206 in the closed position 202 and showing the components of the door mechanism 270, including the mechanical programming system 400. As mentioned above, the door mechanism 270 includes an arm 272 which supports the mass of the door 206 by coupling the door 206 to a side of a door opening 106 in a body 100 (e.g., the fuselage 104) in a manner such that the arm 272 is rotatable about an arm-body hinge axis 294 at an arm-body interface 290, and the door 206 is rotatable about an arm-door hinge axis 303 at an arm-door interface 300. For example, the door 206 can be described as being rotatable about an arm-door virtual axis 326 (FIG. 10) that extends between an arm-door upper hinge axis 304 and an arm-door lower hinge axis 324. The arm 272 extends between the arm-body interface 290 and the arm-door interface 300. The arm-body interface 290 includes an arm-body hinge joint 295 through which the arm-body hinge axis 294 passes. As shown in FIGS. 5-6, the arm-body hinge joint 295 is comprised of an upper arm-body hinge joint 296 and a lower arm-body hinge joint 298.

The arm-body hinge joint 295 allows the arm 272 to rotate about the arm-body hinge axis 294 for moving the door 206 between the closed position 202 (FIGS. 15-18) and the open position 204 (FIGS. 24-27). When viewed from a top-down perspective (e.g., FIG. 11), the arm 272 has an angled shape that allows the arm 272 to be rotated about the arm-body hinge axis 294 through an arm angle 436 (e.g. FIG. 32) such that when the door 206 is in the open position 204, the door 206 is clear of the door opening 106 and also clear of the escape slide 228 when deployed. In the present example, the arm 272 rotates through an arm angle 436 of less than 180 degrees (e.g., approximately 145 degrees) about the arm-body hinge axis 294 when the door 206 is moved from the closed position 202 to the open position 204. However, the geometry of the door mechanism 270 can be configured such that movement of the door 206 from the closed position 202 to the open position 204 requires rotation of the arm 272 through any angular range, including through any arm angle 436 less than or equal to 180 degrees, or through any arm angle 436 greater than 180 degrees.

Figure 10:
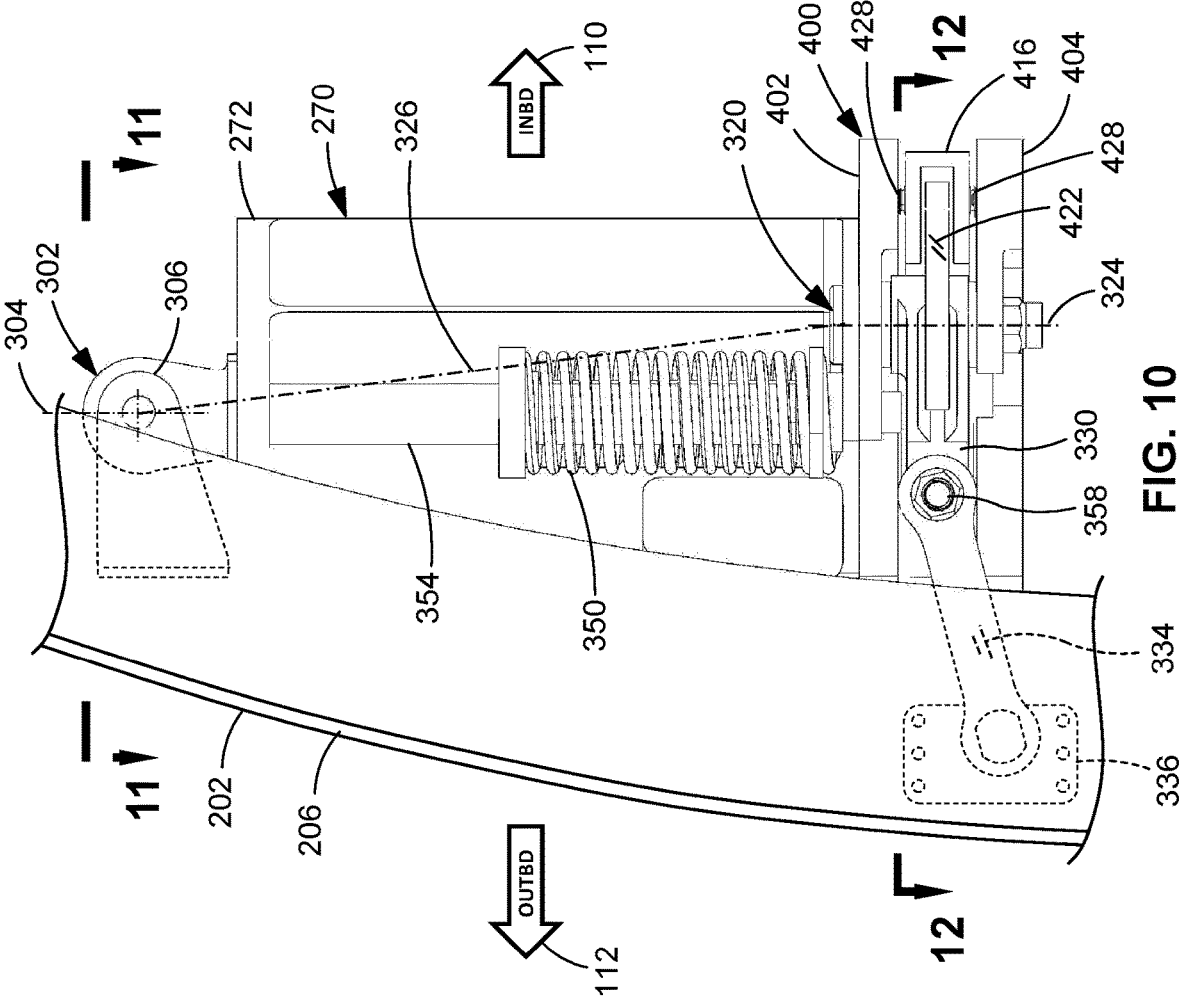
FIG. 10 is a side view of the door mechanism coupled to the arm.

As shown in FIGS. 4-14, the arm-door interface 300 includes an arm-door upper joint 302 and an arm-door lower joint 320. The arm-door upper joint 302 is configured as a spherical joint 306 for accommodating pivoting motion of the door 206 during movement between the closed position 202 and the open position 204. The spherical joint 306 reacts the mass of the door 206 at least in the vertical direction, and is non-reactive of rotational forces about the spherical joint axis 308. FIG. 10 shows the above-mentioned arm-door upper hinge axis 304 which passes through the center of the spherical joint 306. The arm-door upper hinge axis 304 is parallel to the arm-body hinge axis 294 (FIG. 5).

Figure 19:
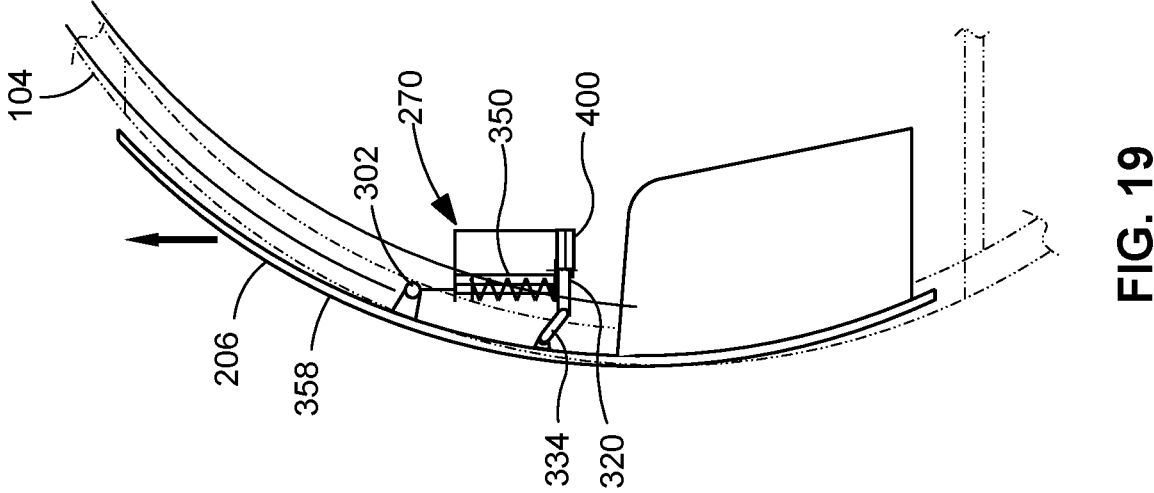
FIG. 19 is a side schematic view of the door vertically lifted from the closed position to a lifted position prior to translation of the door in the outboard direction toward the open position.
Figure 18:
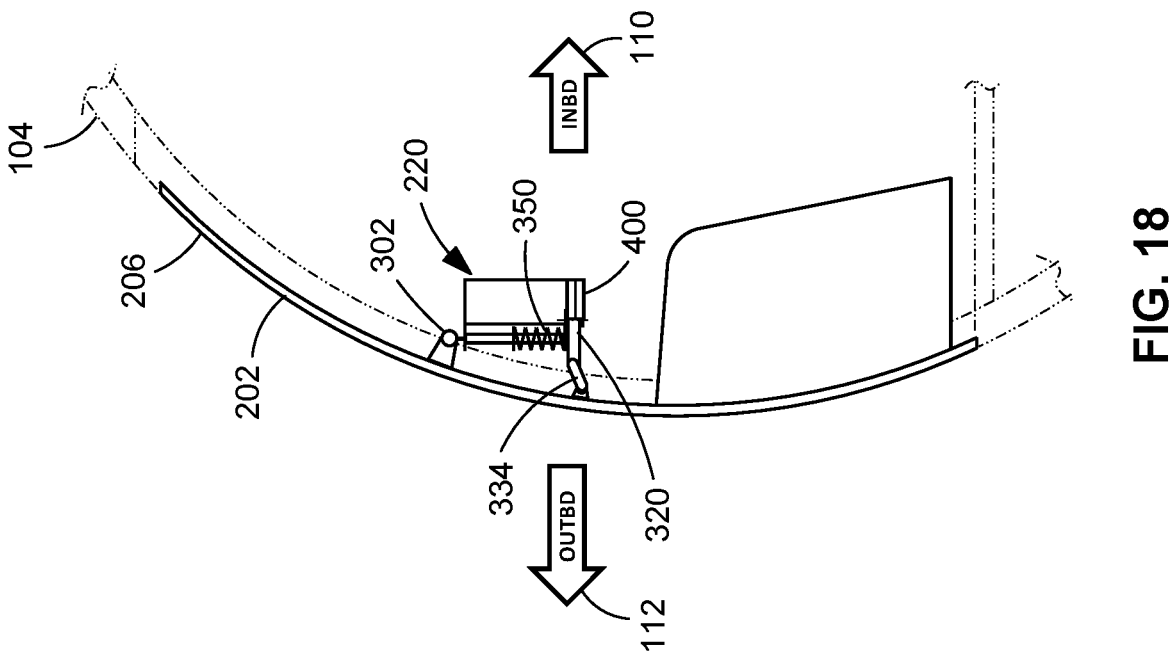
FIG. 18 is a side schematic view of the door in the closed position.

The door mechanism 270 includes a lift assist mechanism 350 configured to assist in moving the door 206 in a vertical direction from the closed position 202 (FIG. 18) to a lifted position 358 (FIG. 19). Movement of the door 206 from the closed position 202 to the lifted position 358 is required for disengaging a plurality of doorstop assemblies 256 (FIG. 4 and six vertically distributed along the sides of the door 206. Each doorstop assembly 256 is comprised of a door fitting 258 (FIGS. 6 and 21-22) mounted to the door 206 and a corresponding body fitting 260 mounted to the side of the door opening 106. When the door 206 is in the closed position 202, each door fitting 258 is engaged to a body fitting 260 (FIGS. 6 and 21-22), which prevents the door 206 in the closed position 202 from moving in the outboard 112 direction when the aircraft 102 cabin is internally pressurized.

The process of moving the door operating handle 216 from the closed orientation 218 to the open orientation (not shown) urges the door 206 in a generally upward direction to the lifted position 358. The primary lifting force for lifting the door 206 is provided by rotating (e.g., manually via a crew member) the door operating handle 216 approximately 180 degrees from its closed orientation 218 to its open orientation. Rotation of the door operating handle 216 causes corresponding rotation of a latch shaft (not shown) mounted to the door 206. Rotation of the latch shaft manipulates latch shaft cranks (not shown) located on opposite ends of the latch shaft. The latch shaft cranks push against guide fitting assemblies 250 (FIG. 4) located on opposite sides of the door opening 106. Each guide fitting assembly 250 is comprised of a post fitting 254 (FIGS. 21-22) mounted to the side of the door 206 and a corresponding guide fitting 252 (FIGS. 21-22) mounted to the side of the door opening 106. Rotation of the door operating handle 216 causes the post fittings 254 to engage the guide fittings 252 in a manner urging the door 206 upwardly from the closed position 202 to the lifted position 358. Once in the lifted position 358, the door 206 can be moved in the outboard 112 direction toward the open position 204 as shown in FIGS. 28-31 and described below.

The direction of movement of the door 206 between the closed position 202 and the lifted position 358 is dictated by the guide fitting assemblies 250. For example, the guide fittings 252 are typically configured to guide the door 206 a short distance (e.g., less than 0.5 inch) in an inboard-upward direction from the closed position 202, after which the guide fitting assemblies 250 direct the door 206 upwardly in the vertical direction a distance of approximately two inches into the lifted position 358. In the lifted position 358, the post fittings 254 and guide fittings 252 on the sides of the door 206 and door opening 106 will clear each other as the door 206 is moved (e.g., manually, via a crew member) in the outboard 112 direction toward the open position 204.

Figure 20:
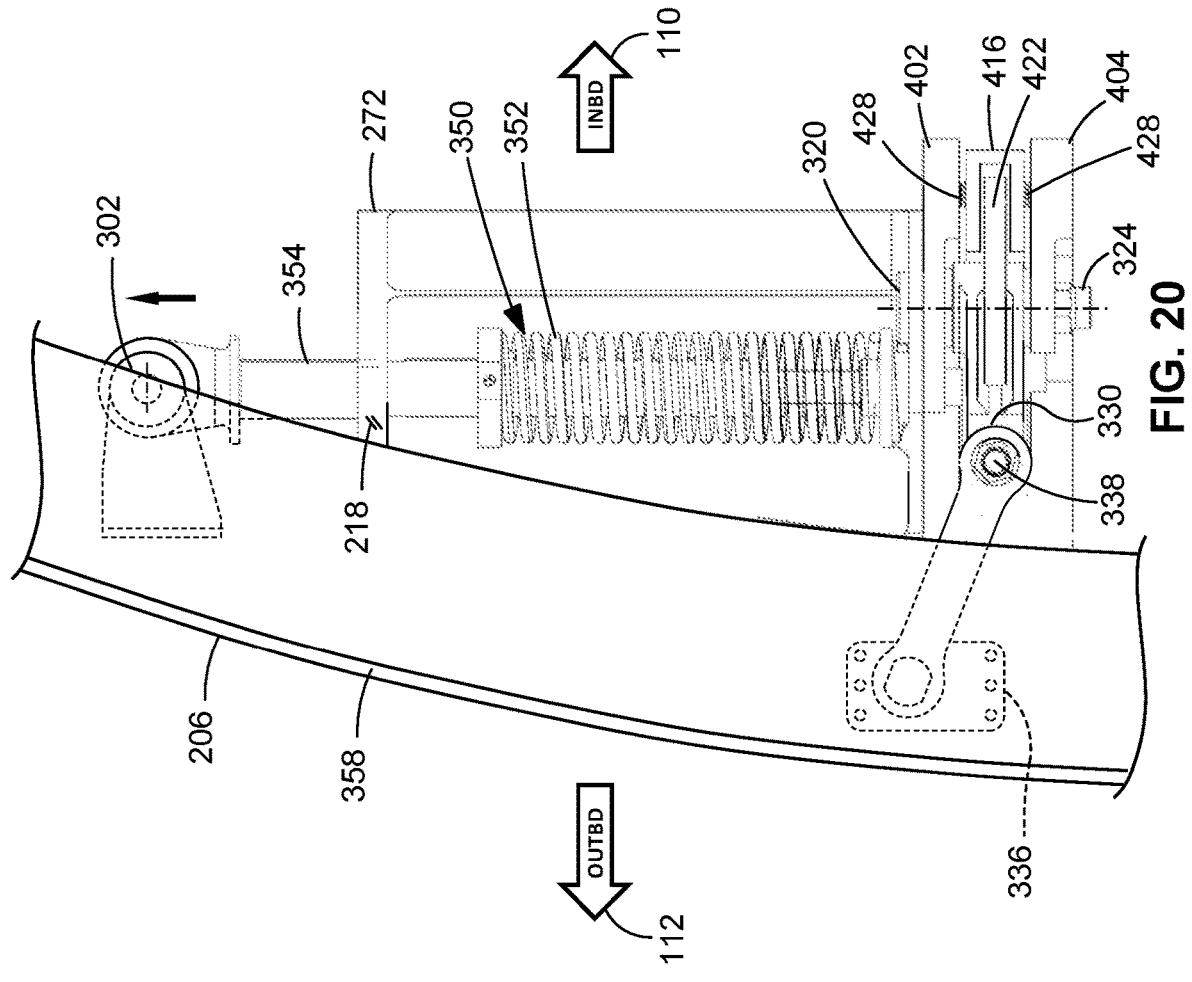
FIG. 20 is a side view of the door mechanism with the door in the lifted position.

As mentioned above, the lift assist mechanism 350 assists in lifting the door 206 from the closed position 202 (FIGS. 10 and 18) to the lifted position 358 (FIGS. 19-20) during rotation of the door operating handle 216. In the example shown, the lift assist mechanism 350 is aligned with the arm-door upper hinge axis 304 and is configured as a compression spring 352 mounted on a lift column 354. The compression spring 352 is captured between an arm lower flange 280 and a column flange 282 fixedly mounted on the lift column 354. The lift column 354 is coupled to an arm upper flange 278 and the arm lower flange 280. To accommodate vertical movement of the door 206, the lift column 354 is axially slidable within an opening formed in the arm upper flange 278 as shown in FIG. 20. Although shown as a compression spring 352, the lift assist mechanism 350 can be provided in any one of a variety of alternative configurations. For example, the lift assist mechanism 350 can be provided as an actuator such as a pneumatic actuator or an electromechanical actuator extending between the arm-door upper joint 302 and the arm lower flange 280. The actuator can be used in conjunction with the compression spring 352, or the actuator can replace the compression spring 352.

In the example of FIGS. 4-14, the spherical joint 306 is a ball-socket end fitting 310 protruding from the upper end of the lift column 354. The ball-socket end fitting 310 is coupled to an upper joint clevis fitting 312 which is mounted directly to the door 206. In addition to universal rotation, the ball-socket end fitting 310 is rotatable about a spherical joint axis 308 defined by a mechanical fastener that couples the ball-socket end fitting 310 to the upper joint clevis fitting 312. The spherical joint 306 may be provided in any one of a variety of alternative configurations and is not limited to the arrangement shown in the figures. For example, the spherical joint 306 can be provided as a ball-socket end fitting 310 protruding in an inboard 110 direction from the door 206, and the upper joint clevis fitting 312 can be mounted on the upper end of the lift column 354. Other configurations are possible for the spherical joint 306, such as a universal joint, or any one of a variety of other joint configurations that can accommodate substantially universal rotation of the door 206 relative to the arm 272.

Figure 11:
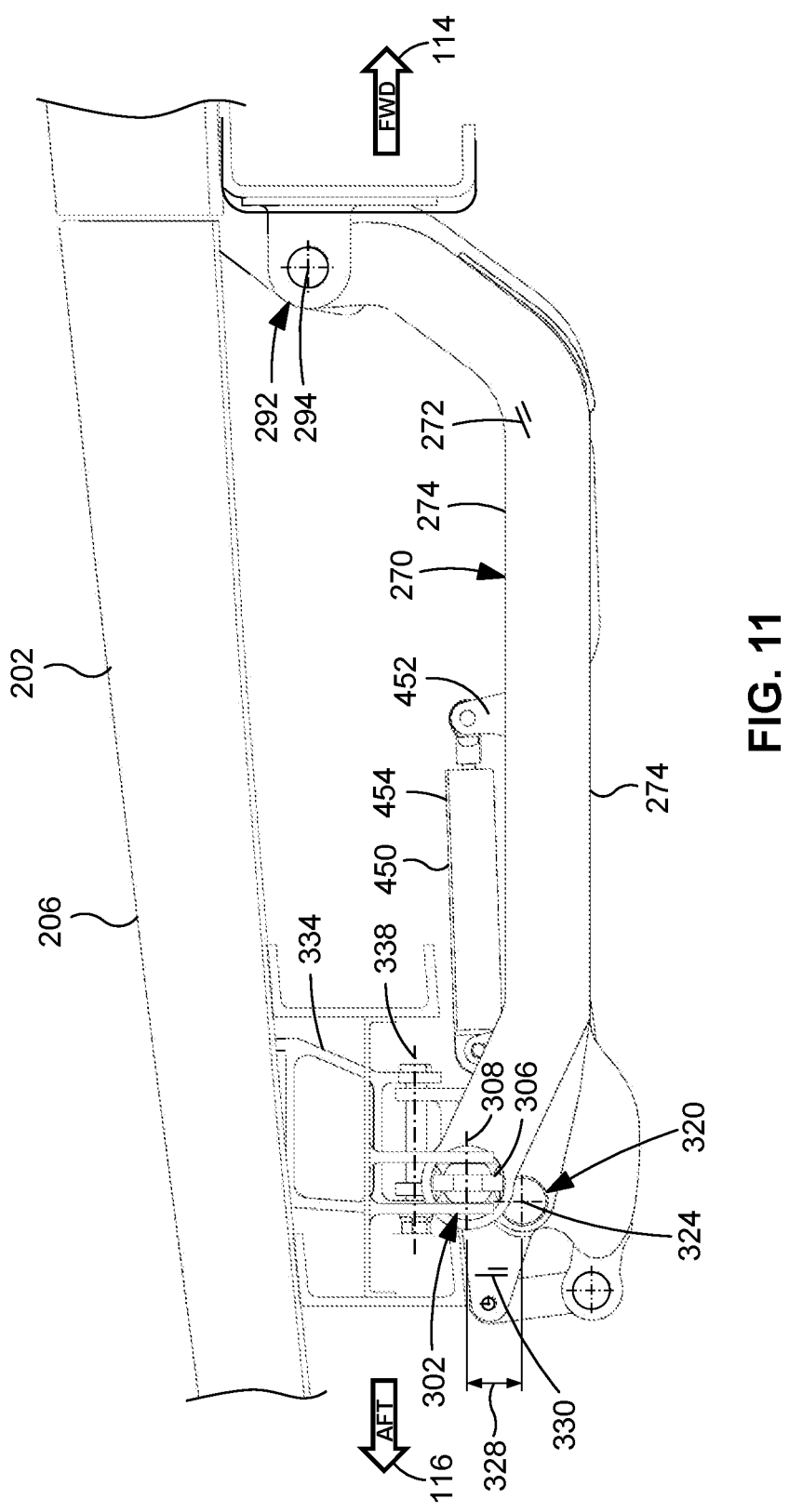
FIG. 11 is a top-down view of the door mechanism taken along line 11-11 of FIG. 10 showing an arm-door door hinge axis of the arm-door lower joint located inboard of an arm-door upward hinge axis of the arm-door upper joint.

The arm-door lower joint 320 is located below and inboard 110 (i.e., inboard offset 328) of the arm-door upper joint 302 when the door 206 is in the closed position 202 as shown in FIG. 11. The arm-door lower joint 320 reacts rotational forces of the door 206 via the door pivot crank 330 and the trapeze 334. The mechanical programming system 400 controls the orientation of the door 206 relative to the arm 272 via inputs to the door pivot crank 330, as described below.

Figure 28:
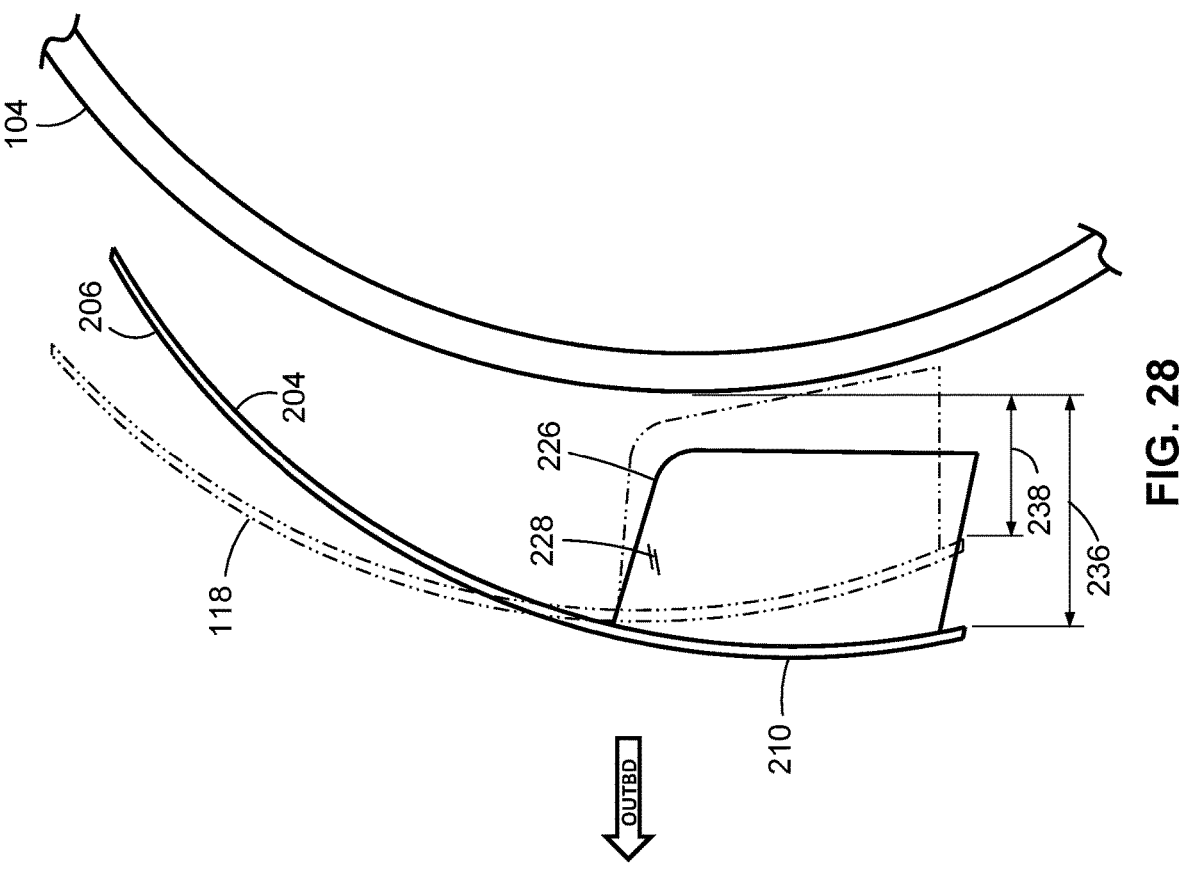
FIG. 28 is a schematic end view of the door in the open position showing the door tilted at an angle and the resulting increase in the distance between the door lower portion and the fuselage due to the location of the arm-door lower joint inboard of the arm-door upper joint.

The arm-door lower joint 320 is pivotable about the spherical joint 306 (i.e., the arm-door upper joint 302) in a manner causing the arm-door lower joint 320 and the door lower portion 210 to move in the outboard 112 direction away from the body 100 (e.g., the fuselage 104) a greater distance than the door upper portion 208 when the door 206 is moved from the closed position 202 to the open position 204. As shown in FIG. 28, the door 206 has a tilted orientation in the open position 204 as a result of the location of the arm-door lower joint 320 inboard 110 of the arm-door upper joint 302 when the door 206 is in the closed position 202 (FIG. 11). The tilted orientation of the door 206 results in an increased distance 236 between the door lower portion 210 and the fuselage 104, relative to a nominal distance 238 between the door lower portion 210 and the fuselage 104 of a conventional door 118 supported by a conventional door mechanism (not shown), as described below.

The arm-door lower joint 320 has the above-mentioned arm-door lower hinge axis 324. The arm-door lower hinge axis 324 passes through the arm lower flange 280 and through an upper track plate 402 and a lower track plate 404 of the mechanical programming system 400. The arm-door lower hinge axis 324 is parallel to the arm-body hinge axis 294. FIG. 10 shows the arm-door virtual axis 326 that extends between the spherical joint 306 and the arm-door lower hinge axis 324. When the door 206 is moved between the closed position 202 and the open position 204, the motion of the arm-door lower joint 320 can be described as a rotational motion about the arm-door virtual axis 326.

Figures 31, 32:
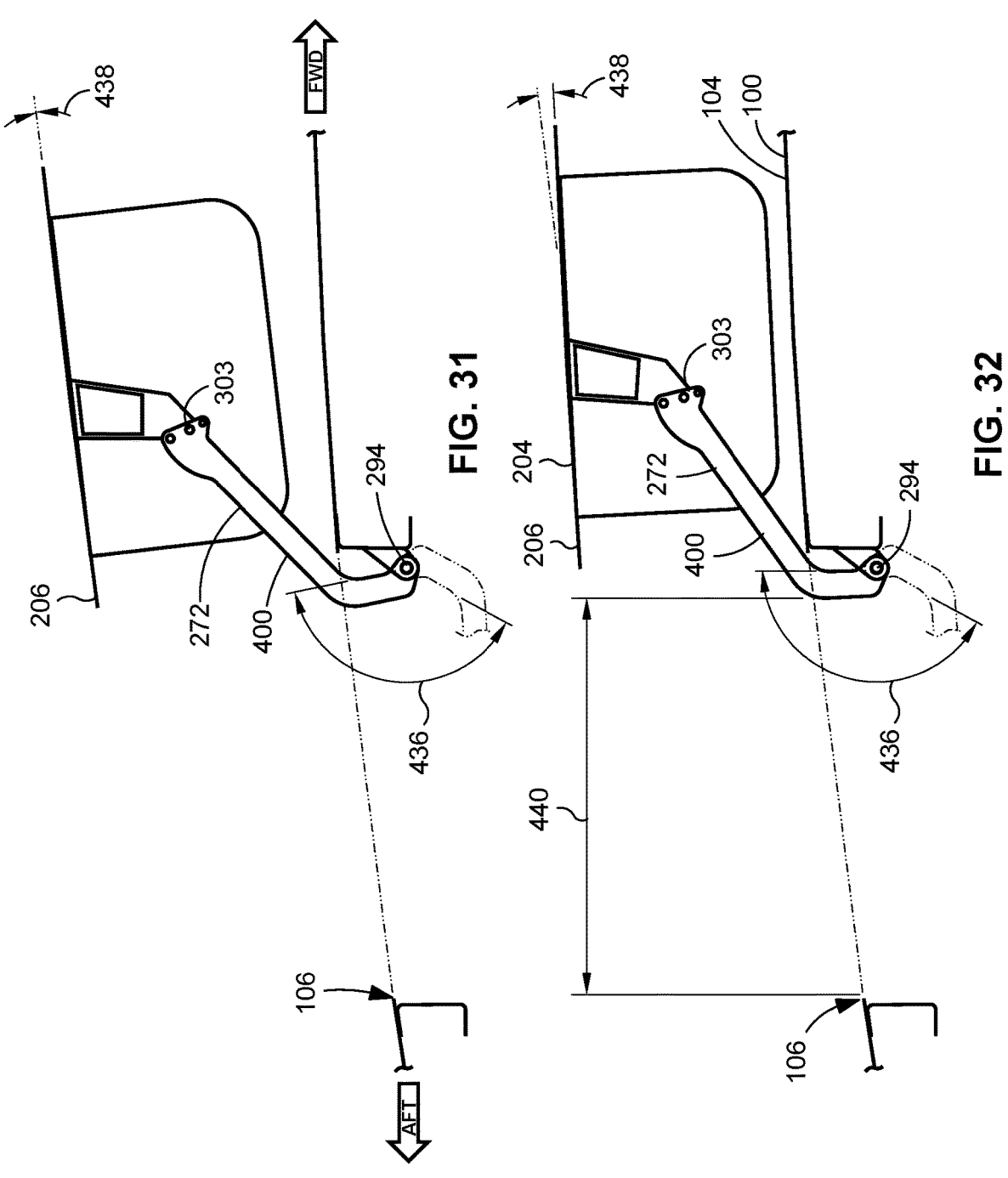
FIG. 31 is a top-down schematic view of the door after rotation of the arm through an angle of approximately 135 degrees about the arm-body hinge axis, and illustrating the door oriented parallel to the door opening.
FIG. 32 is a top-down schematic view of the door in the closed position after rotation of the arm through an angle of approximately 145 degrees about the arm-body hinge axis, and illustrating the door oriented at a negative door angle in which the door is non-parallel to the door opening but is parallel to the contour of the fuselage.

In addition to being offset in the inboard 110 direction (FIG. 11), the arm-door lower joint 320 (i.e., the arm-door lower hinge axis 324) is also offset from the arm-door upper joint 302 in an axial direction of the body 100 at a distance further from the arm-body interface 290 than the arm-door upper joint 302. For example, in FIG. 11, the arm-door lower joint 320 (i.e., the arm-door lower hinge axis 324) is offset from the arm-door upper joint 302 in the aft 116 direction of the fuselage 104. The offset of the arm-door lower hinge axis 324 in both the inboard 110 direction and the aft 116 direction is complementary to rotation of the arm 272 through an angular range (FIG. 31) of 145 degrees about the arm-body hinge axis 294 to move the door 206 into the open position 204 (FIG. 32).

When the fuselage 104 is viewed for a side-view perspective as shown in FIG. 2, the offset of the arm-door lower hinge axis 324 in both the inboard 110 direction and the aft 116 direction results in the door 206 in the open position 204 being oriented generally parallel to the door opening 106. In this regard, the arm-door lower joint 320 (i.e., the arm-door lower hinge axis 324) can be offset from the arm-door upper joint 302 by any amount in the axial direction (e.g., in either the forward 114 direction or the aft 116 direction). The amount of offset in the axial direction may be dictated by the angular range through which the arm 272 must be rotated in order to move the door 206 from a closed position 202 to a desired open position 204. For example, for an arrangement (not shown) in which movement of a door 206 from the closed position 202 to the open position 204 requires rotation of the arm 272 through an arm angle 436 of exactly 180 degrees, the door mechanism 270 can be configured such that the arm-door lower joint 320 (i.e., the arm-door lower hinge axis 324) is at the same axial location as the arm-door upper joint 302 (i.e., no axial offset).

Referring to FIGS. 5-14, the arm-door lower joint 320 includes a door pivot crank 330 (FIG. 8) and a trapeze 334 (FIG. 8) connecting the arm 272 to the door 206. The door pivot crank 330 is rotatable about the arm-door lower hinge axis 324. The trapeze 334 connects the door pivot crank 330 to the door 206. The trapeze 334 has opposing trapeze 334 ends, each of which is configured to pivot about an axis oriented perpendicular to the arm-door lower hinge axis 324. In this regard, one of the trapeze ends is coupled to the door pivot crank 330 and is rotatable about a trapeze-crank axis 338, and the other trapeze end is coupled to the door 206 via a door bracket 336 and is rotatable about a trapeze-door axis 340. The ability of the trapeze 334 to rotate about the trapeze-crank axis 338 and the trapeze-door axis 340 accommodates vertical movement of the door 206 relative to the arm 272, such as when the door 206 is lifted from the closed position 202 (FIG. 10) to the lifted position 358 (FIG. 20) via rotation of the door operating handle 216 and with assistance from the lift assist mechanism 350.

Figure 12:
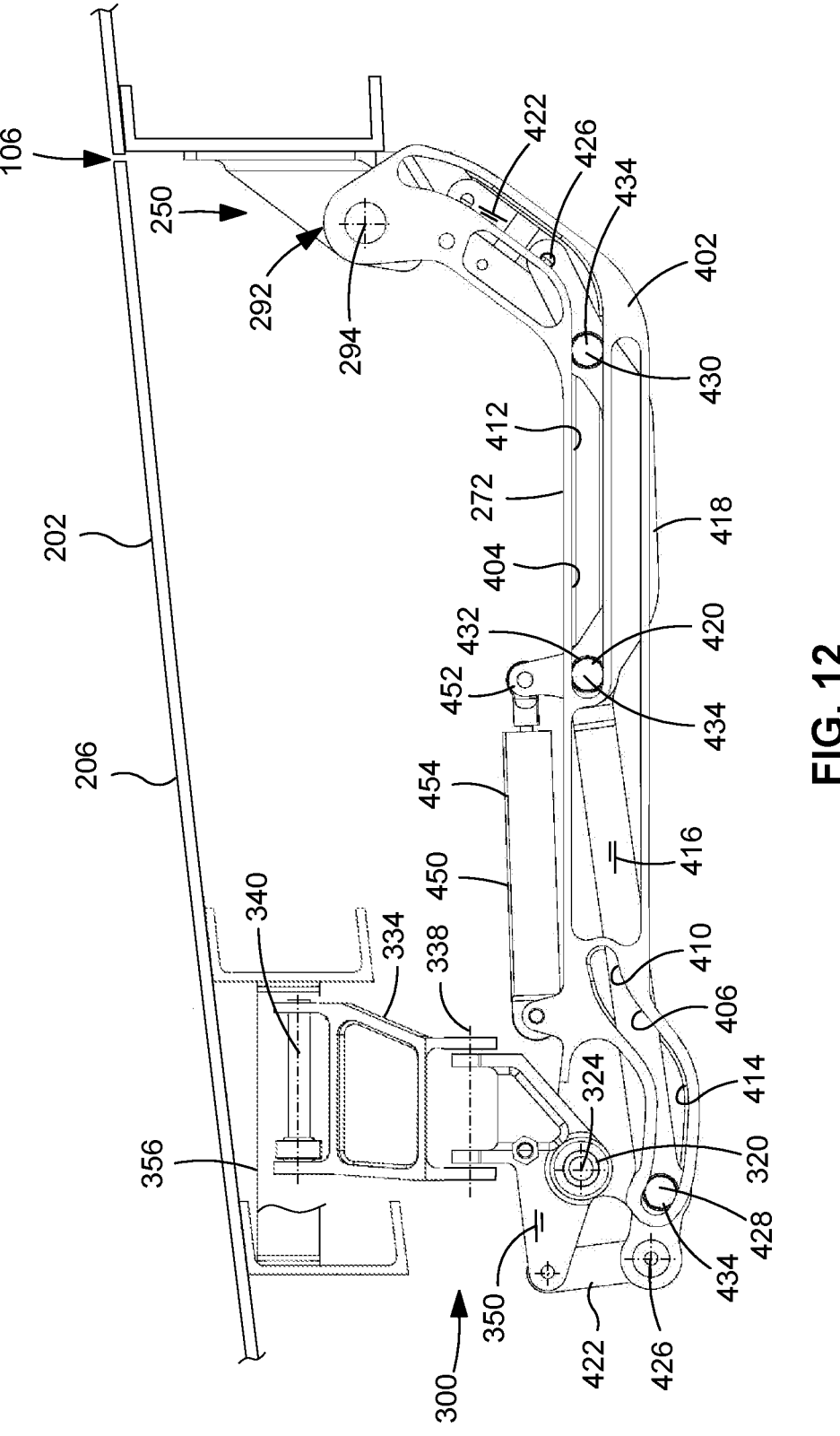
FIG. 12 is a top-down view of the door mechanism taken along line 12-12 of FIG. 10.
Figures 13, 14:
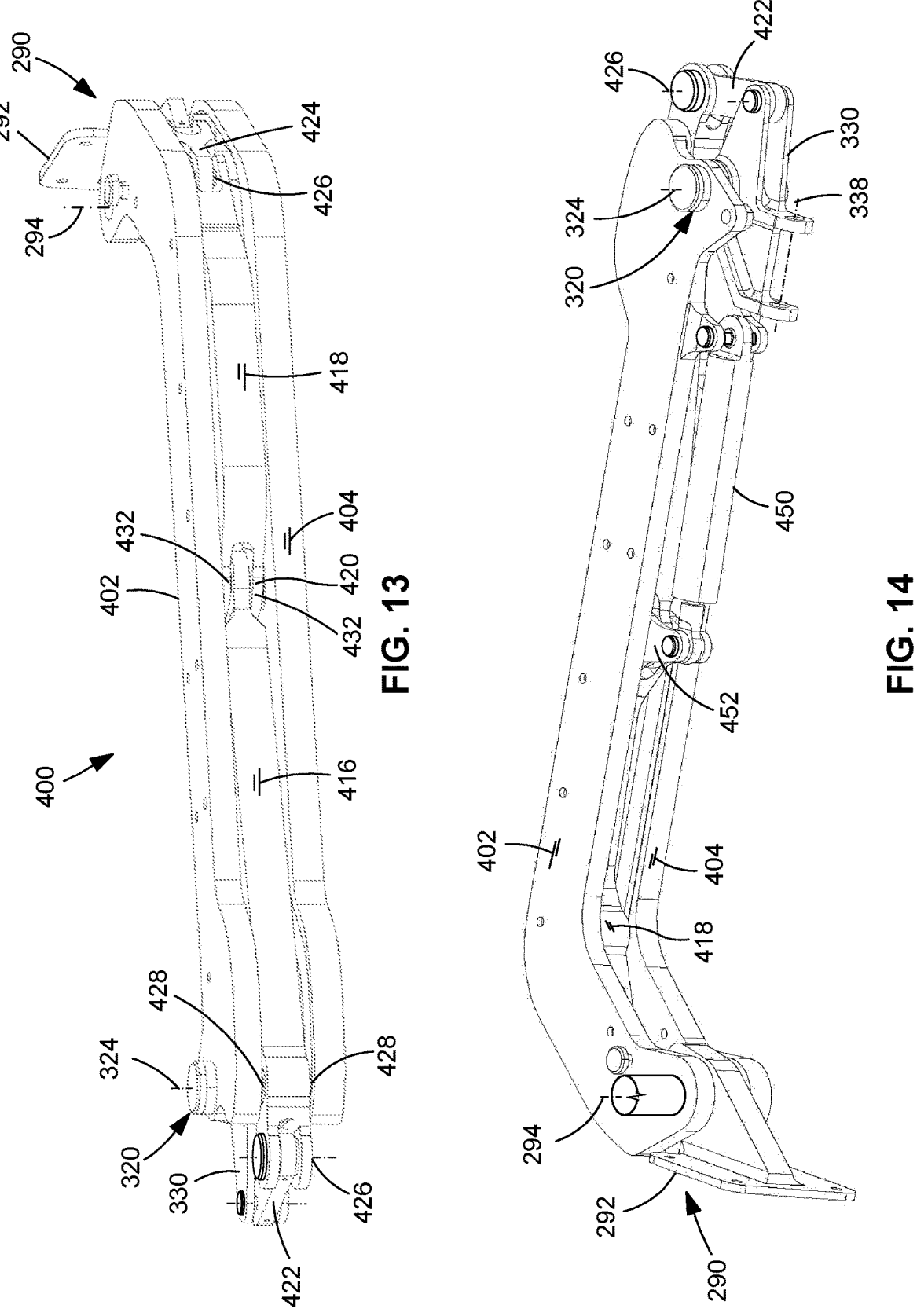
FIG. 13 is an outboard-looking perspective view of an example of the mechanical programming system having a first primary link and a second primary link connected in series and extending between the arm-body interface and the arm-door interface and showing the first and second primary links slidably engaged to a first track and a second track formed in an upper track plate and a lower track plate via track engaging elements.
FIG. 14 is an inboard-looking perspective view of the mechanical programming system of FIG. 13 showing a damper attached at one end to the arm, and an opposite end of the damper is attached to a track engaging element located at the juncture of the first primary link and the second primary link.
Figure 16:
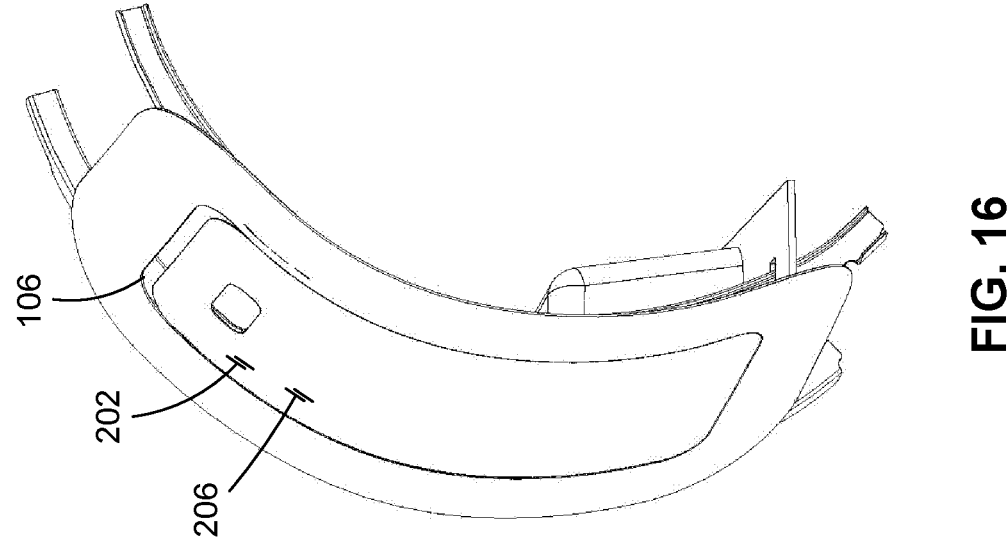
FIG. 16 is an inboard-looking perspective view of the door in the closed position.
Figure 15:
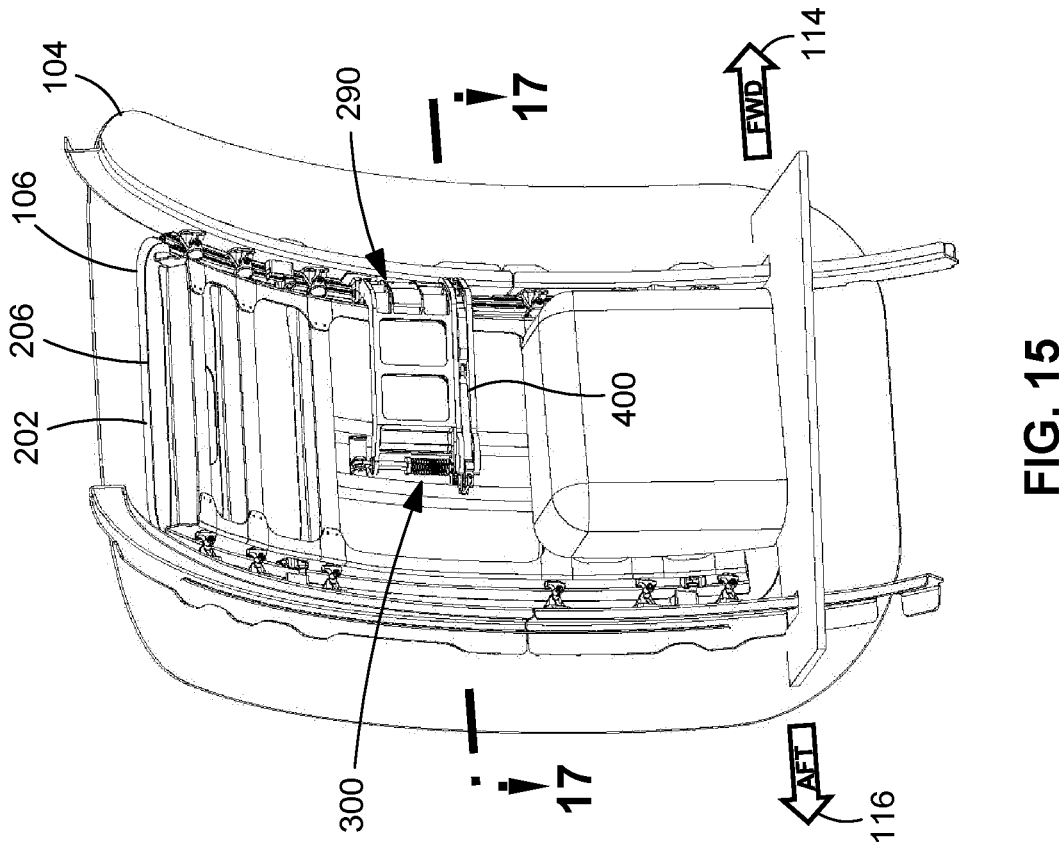
FIG. 15 is an outboard-looking perspective view of the door in the closed position.

As mentioned above, the mechanical programming system 400 controls the orientation of the door 206 (e.g., an emergency egress door) relative to a body 100 (e.g., a fuselage 104) during translation of the door 206 between the closed position 202 and the open position 204. Referring to FIGS. 12-14, the mechanical programming system 400 has at least one track and at least two links. The links are connected in series between the arm-body interface 290 and the arm-door interface 300. The one or more tracks are provided as horizontally oriented grooves or slots formed in, or coupled to, the arm 272. The one or more tracks are shaped in a manner to control (i.e., program) the orientation of the door 206 during translation from the closed position 202 to the open position 204. In the example shown, the tracks are formed in each of an upper track plate 402 and a lower track plate 404, and the links are captured between the upper track plate 402 and the lower track plate 404. In the example shown, the upper track plate 402 and the lower track plate 404 are mechanically fastened to the arm 272. However, in other examples not shown, the upper track plate 402 and/or the lower track plate 404 can be integrally machined into the arm 272.

The links are pivotally connected end-to-end in a chain-like manner via one or more pin joints. In the example shown, the links include a first primary link 416 and a second primary link 418 pivotably connected to each other at a primary link pin joint 420. However, in other examples not shown, the mechanical programming system 400 can include three or more primary links connected end-to-end, in addition to end links located respectively at the arm-door interface 300 and the arm-body interface 290. As shown in FIGS. 12-14, the links are configured as rod-like members connected in a manner allowing the links to rotate relative to each other at the pin joints. An end-to-end pair of links can be coupled to each other via a pin joint configured as a link clevis fitting on the end of one of the links and an eye fitting on a mating end of the other link. Regardless of the manner of end-to-end connection, the series of links are configured to transmit rotational motion of the arm 272 about the arm-body hinge axis 294 to the door 206 for rotation about the arm-door hinge axis 303.

In the mechanical programming system 400, at least one of the links has at least one track engaging element coupling or engaging the links to the tracks. In this regard, each track engaging element is fixedly mounted to a link. Each track engaging element can be configured as a bushing or roller. For example, each track engaging element can be configured as a stud track roller 434 having a vertically oriented stud and a roller. The roller is mounted on an end of the stud and engages the track. Although shown as a stud track roller 434, the track engaging element may be provided in any one of a variety of alternative configurations, and is not limited to a stud track roller 434. For example, each track engaging element can be configured as sliding block (not shown) configured to engage a track. Regardless of their specific configuration, the track engaging elements provide a sliding interface within the tracks to positively control the orientation of the links for all positions of the door 206 during its opening sequence from the open position 204 to the closed position 202.

Referring to FIGS. 12-14, the upper track plate 402 and the lower track plate 404 each have identical track arrangements. For example, the upper track plate 402 and the lower track plate 404 each have a first track 406 and a second track 408 arranged in series. Although the first track 406 and the second track 408 in each track plate are separated from each other, in another example not shown, the first track 406 and second track 408 in the upper track plate 402 can be combined into a single continuous track, and the first track 406 and the second track 408 in the lower track plate 404 can be combined into a single continuous track.

The first primary link 416 includes at least one first track engaging element 428 coupling the first primary link 416 to the first track 406 at a location proximate the door pivot crank 330. More specifically, the first primary link 416 has a first track engaging element 428 protruding from the upper side of the first primary link 416 and extending into the first track 406 in the upper track plate 402, and another first track engaging element 428 protruding from the lower side of the first primary link 416 and extending into the first track 406 in the lower track plate 404. A first end link 422 pivotally connects the first primary link 416 to the door pivot crank 330. The first primary link 416 is coupled to the first end link 422 at an end link pin joint 426. As described above, the door pivot crank 330 is configured to rotate about the arm-door lower hinge axis 324, and is connected to the door 206 via the trapeze 334.

Referring still to FIGS. 12-14, the second primary link 418 includes at least one second track engaging element 430 coupling the second primary link 418 to the second track 408 at a location proximate the arm-body hinge fitting 292. More specifically, the second primary link 418 has a second track engaging element 430 protruding from the upper side of the second primary link 418 and extending into the second track 408 in the upper track plate 402, and another second track engaging element 430 protruding from the lower side of the second primary link 418 and extending into the second track 408 in the lower track plate 404. A second end link 424 pivotally connects the second primary link 418 to the arm-body hinge fitting 292 on the lower side of the arm 272. The second primary link 418 is coupled to the second end link 424 at an end link pin joint 426. As described above, the arm-body hinge fitting 292 is mounted to the door opening 106.

The first primary link 416 and the second primary link 418 are pivotably connected to each other at a primary link pin joint 420. The primary link pin joint 420 is coupled to the second track 408 via at least one intermediate track engaging element 432 located between the first track engaging element 428 and the second track engaging element 430. For example, in FIGS. 12-14, one intermediate track engaging element 432 protrudes from an upper side of the primary link pin joint 420 and extending into the second track 408 in the upper track plate 402, and another intermediate track engaging element 432 protrudes from a lower side of the primary link pin joint 420 and extending into the second track 408 in the lower track plate 404. Although the presently-disclosed example of the mechanical programming system 400 has two links (i.e., the first primary link 416 and the second primarily) which are each engaged to the tracks, in other examples of the mechanical programming system 400 having multiple links, only one of the primary links can be engaged to a track, and the remaining primary links can be non-engaged to the tracks.

In the example of FIGS. 11-14, the mechanical programming system 400 includes a damper 450 (e.g., a pneumatic damper) extending between the links and the arm 272. The damper 450 is configured to dampen rotational inertia of the door 206 during translation of the door 206 between closed position 202 and the open position 204. In the example shown, one end of the damper 450 is attached to a link tab 452 protruding from the primary link pin joint 420 at the juncture of the first primary link 416 and the second primary link 418. An opposite end of the damper 450 is attached to the arm 272 at a location aft 116 of the primary link pin joint 420. However, the damper 450 may extend between any location on the arm 272 and any location on the links.

As an alternative to or in addition to a damper 450, the mechanical programming system 400 can include a linear actuator 454 extending between the arm 272 and the links. For example, the mechanical programming system 400 can include a linear actuator 454 extending between the arm 272 and the primary link pin joint 420 at the juncture of the first primary link 416 and the second primary link 418. In one example, the linear actuator 454 can be provided as a pneumatic actuator or as an electromechanical actuator. The linear actuator 454 can be configured to move one or more of the track engaging elements along the one or more tracks in a manner moving the door 206 between the closed position 202 and the open position 204, either with or without human assistance. Alternatively, the linear actuator 454 can be limited to assisting in moving the door 206 at the beginning of the opening sequence and/or at the end of the closing sequence. For example, once door 206 has been manually (e.g., via a member of the aircraft crew) moved from the open position 204 and is nearing the closed position 202, the linear actuator 454 can be automatically actuated to complete the closing sequence by snubbing the door 206 into the closed position 202.

Figures 29, 30:
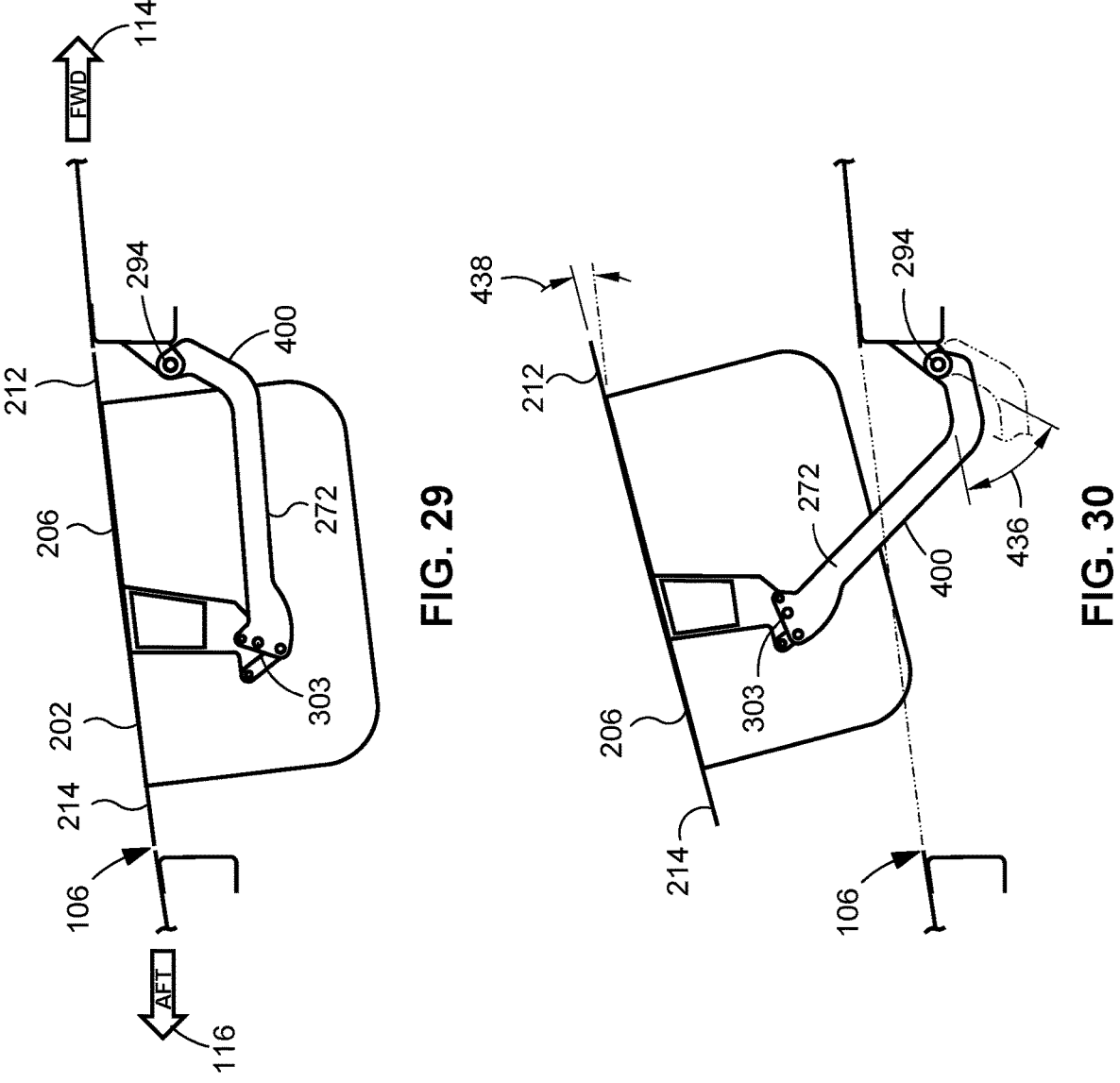
FIG. 29 is a top-down schematic view of the door in the closed position.
FIG. 30 is a top-down schematic view of the door in an intermediate position of the opening sequence after rotation of the arm through an arm angle of 45 degrees about the arm-body hinge axis, and further illustrating the door oriented at a positive door angle in which the door is non-parallel to the door opening.

As shown in FIG. 12, the one or more tracks of the mechanical programming system 400 have a directional path shape 410 that dictates the movement of the track engaging elements during translation of the door 206 between the closed position 202 in the open position 204. The directional path shape 410 of the tracks causes the orientation of at least one of the links to change relative to the arm 272 as the track engaging elements slide along the tracks. In this regard, directional path shape 410 of the tracks is configured to maintain the door 206 generally parallel to the door opening 106 during the opening sequence in which the door 206 is translated from the closed position 202 to the open position 204, and allow non-parallel orientations of the door 206 at one or more points during the opening sequence as shown in FIGS. 30 and 31 as described below. To achieve non-parallel orientations of the door 206 during the opening sequence, the lengthwise shape of the tracks is non-linear when viewed from a top-down perspective. For example, as shown in FIG. 12, the directional path shape 410 of the tracks can include a combination of one or more straight sections 412 and/or one or more curved sections 414, and which are designed to influence the manner in which the orientation of the door 206 changes during the opening sequence, similar to the manner in which a follower (not shown) follows the shape of a cam (not shown) during rotation of the cam.

Figure 17:
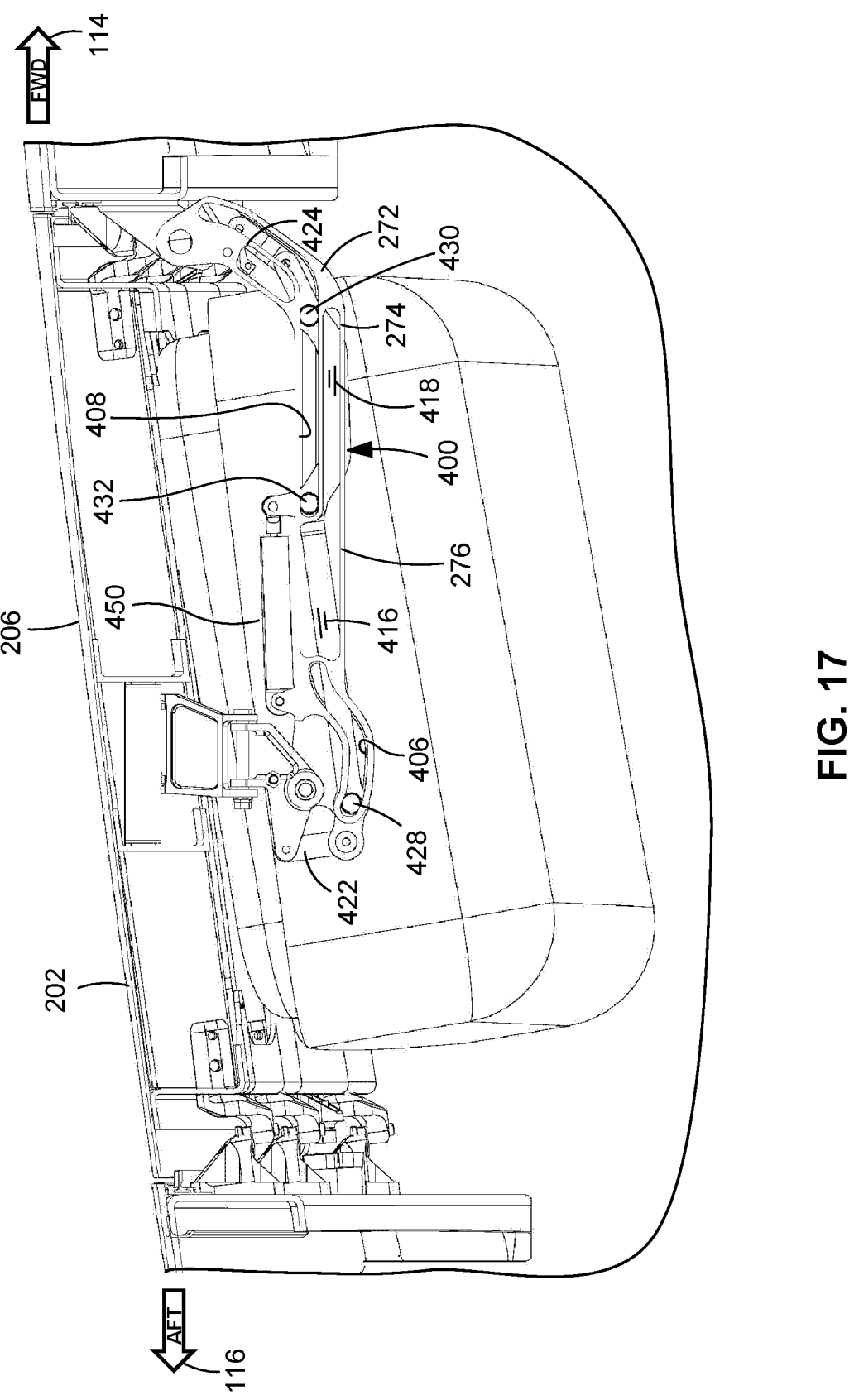
FIG. 17 is a top-down sectional view of the mechanical programming system taken along line 17-17 of FIG. 15 and showing the orientations of the first primary link and second primary link when the door is in the closed position.

Referring to FIGS. 15-27, shown is an example of a door 206 (e.g., an emergency egress door) during different stages of the opening sequence. FIGS. 15-18 show the door 206 in the closed position 202. FIG. 17 is a top-down sectional view of the mechanical programming system 400 showing the orientations of the first primary link 416 and second primary link 418 when the door 206 is in the closed position 202. The directional path shape 410 of the tracks is configured such that the link outer profiles (e.g., the outermost surfaces or edges of the links) of the first primary link 416 and second primary link 418 are generally within the arm envelope 276, which is defined by the arm outer surfaces 274 (FIG. 9) of the arm 272 when viewed from a top-down perspective. In this regard, the geometry of the first and second primary links 416, 418 and the directional path shape 410 is such that in general, the link outer profiles do not protrude in the inboard 110 (FIG. 10) direction from the arm envelope 276, which may otherwise require alteration of the interior architecture, such as the trim panels 224 (FIG. 3) typically located on the inboard 110 side of the door 206 to cover the door mechanism 270 components including the mechanical programming system 400.

Figures 21, 22:
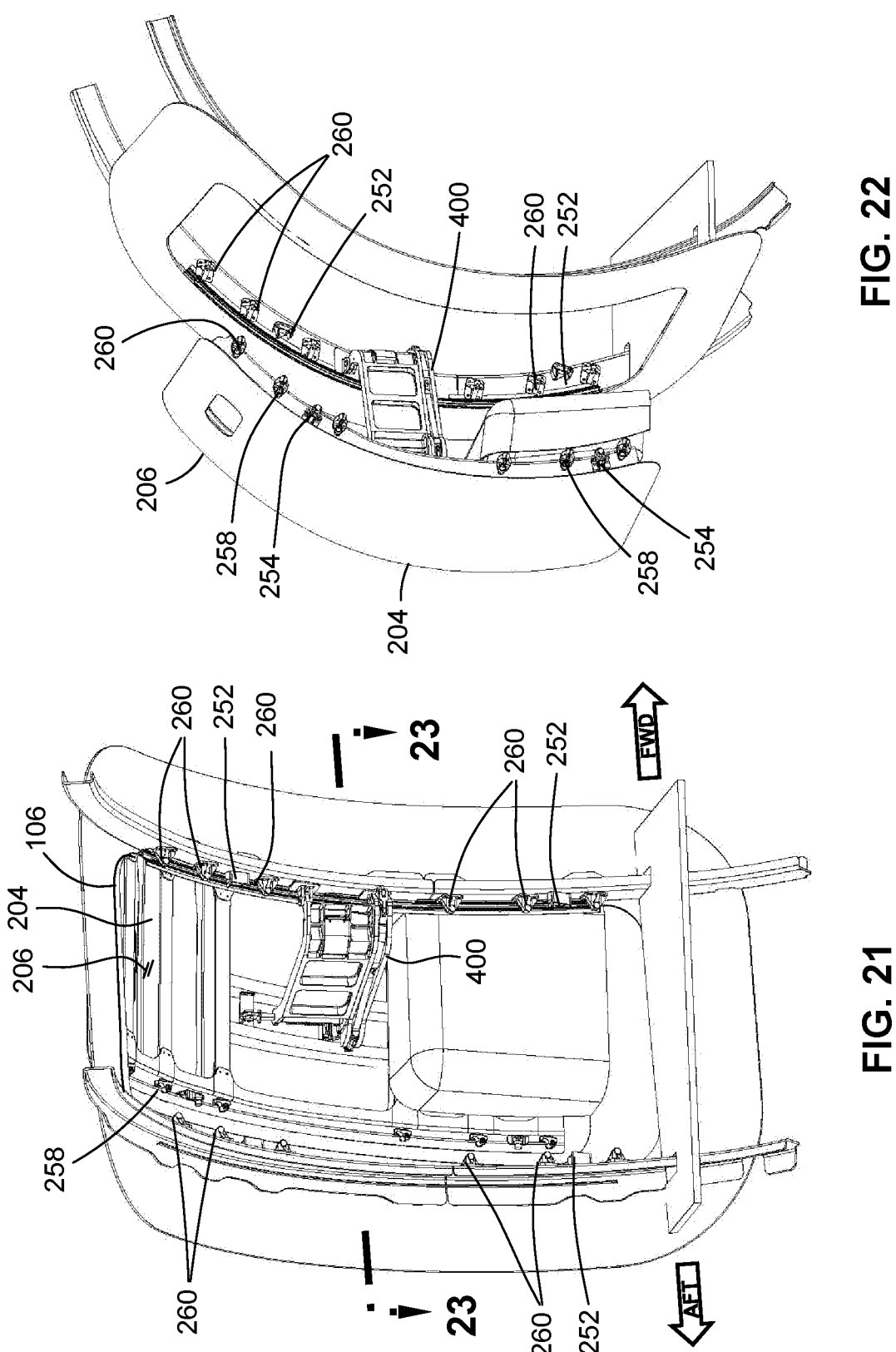
FIG. 21 is an outboard-looking perspective view of the door in an intermediate position of the opening sequence of translating the door from the closed position to the open position.
FIG. 22 is an inboard-looking perspective view of the door in the intermediate position of FIG. 21.
Figure 23:
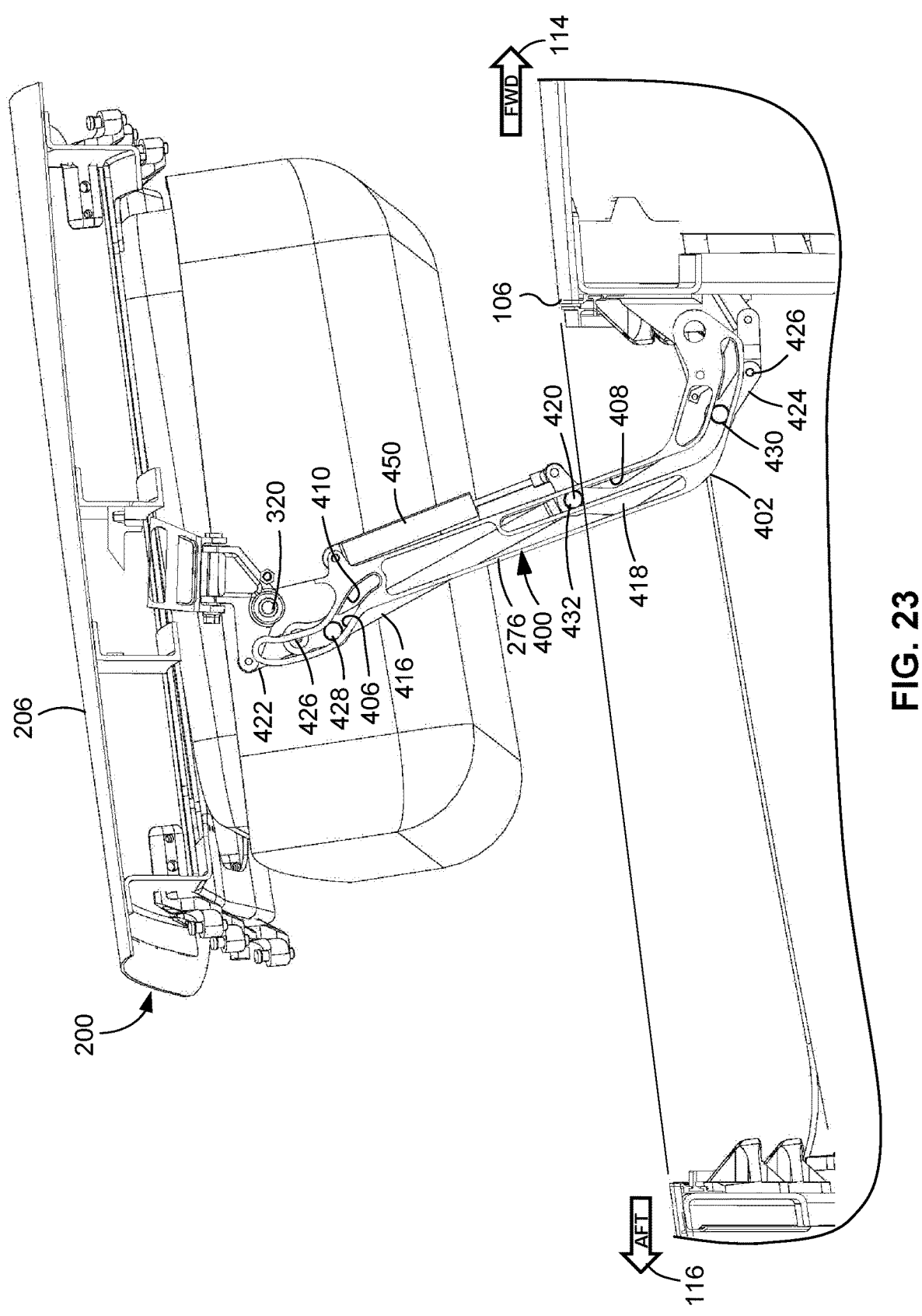
FIG. 23 is a top-down sectional view of the mechanical programming system taken along line 23-23 of FIG. 21 showing the orientations of the first and second primary links when the door is in the intermediate position.

FIGS. 19-20 show the door 206 in the lifted position 358 prior to movement in the outboard 112 direction toward the open position 204. FIGS. 21-22 show the door 206 in an intermediate position of the opening sequence. FIG. 23 is a top-down sectional view of the mechanical programming system 400 showing the orientations of the first and second primary links 416, 418 when the door 206 is in the intermediate position. The first track engaging element 428 has moved to an approximate midpoint along the first track 406, and the intermediate track engaging element 432 and the second track engaging element 430 have moved along the second track 408. The directional path shape 410 of the tracks is such that the link outer profiles (e.g., the outermost surfaces or edges) of the first primary link 416 and second primary link 418 remain generally within the arm envelope 276 when the door 206 is in the intermediate position.

Figures 24, 25:
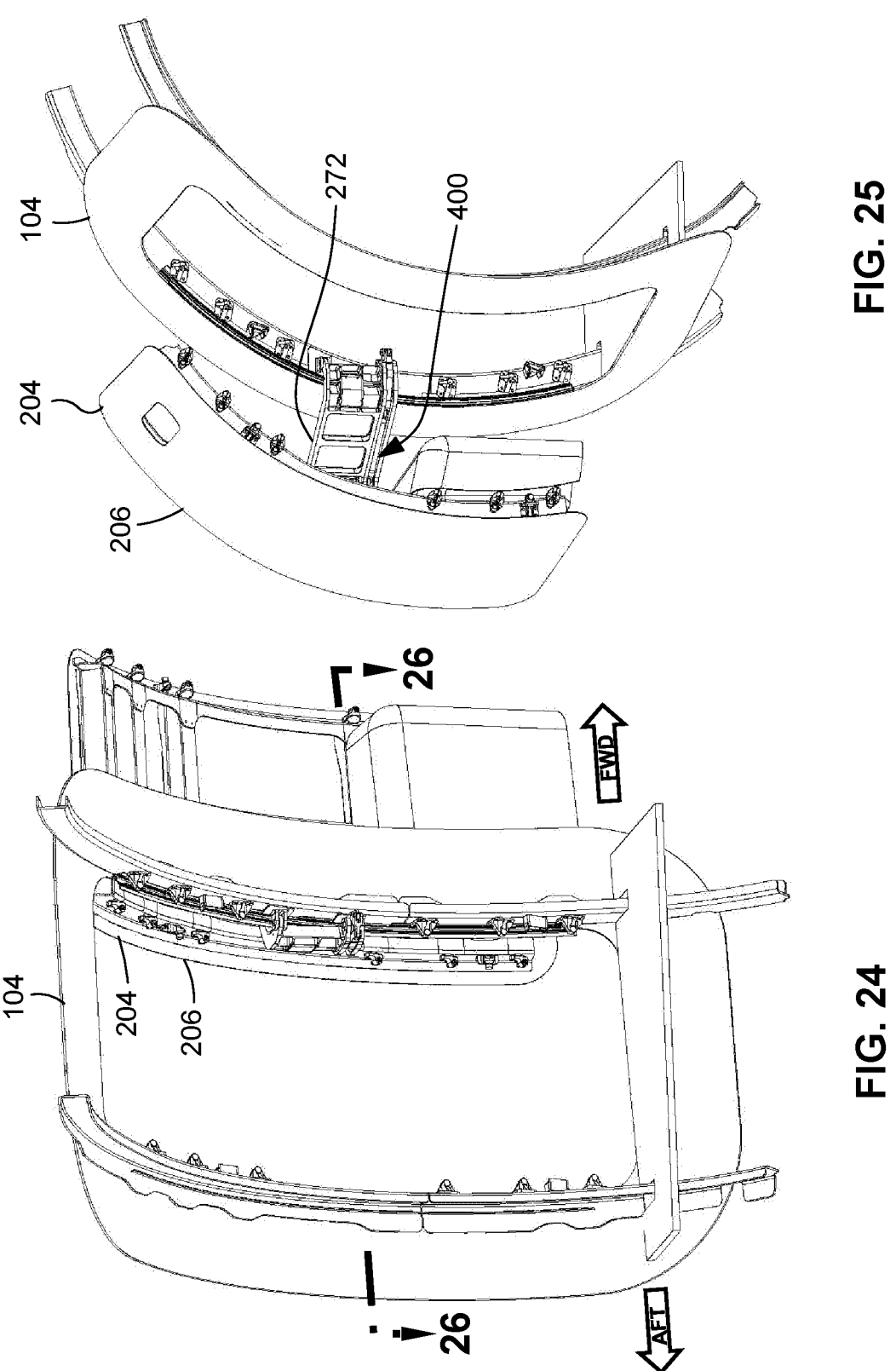
FIG. 24 is an outboard-looking perspective view of the door in an open position.
FIG. 25 is an inboard-looking perspective view of the door in the open position.
Figure 26:
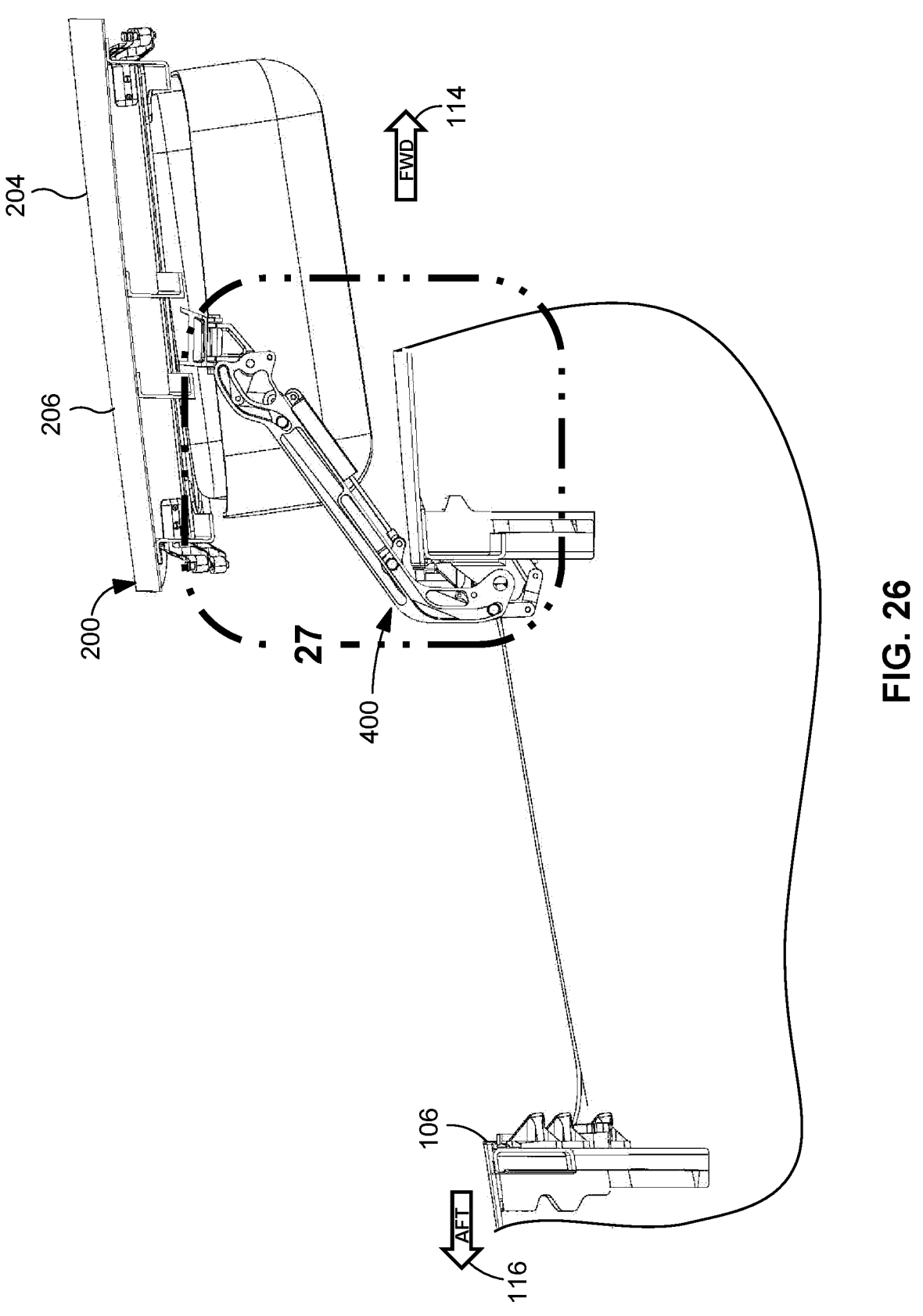
FIG. 26 is a top-down sectional view of the mechanical programming system taken along line 26-26 of FIG. 24 showing the orientations of the first and second primary links when the door is in the open position.
Figure 27:
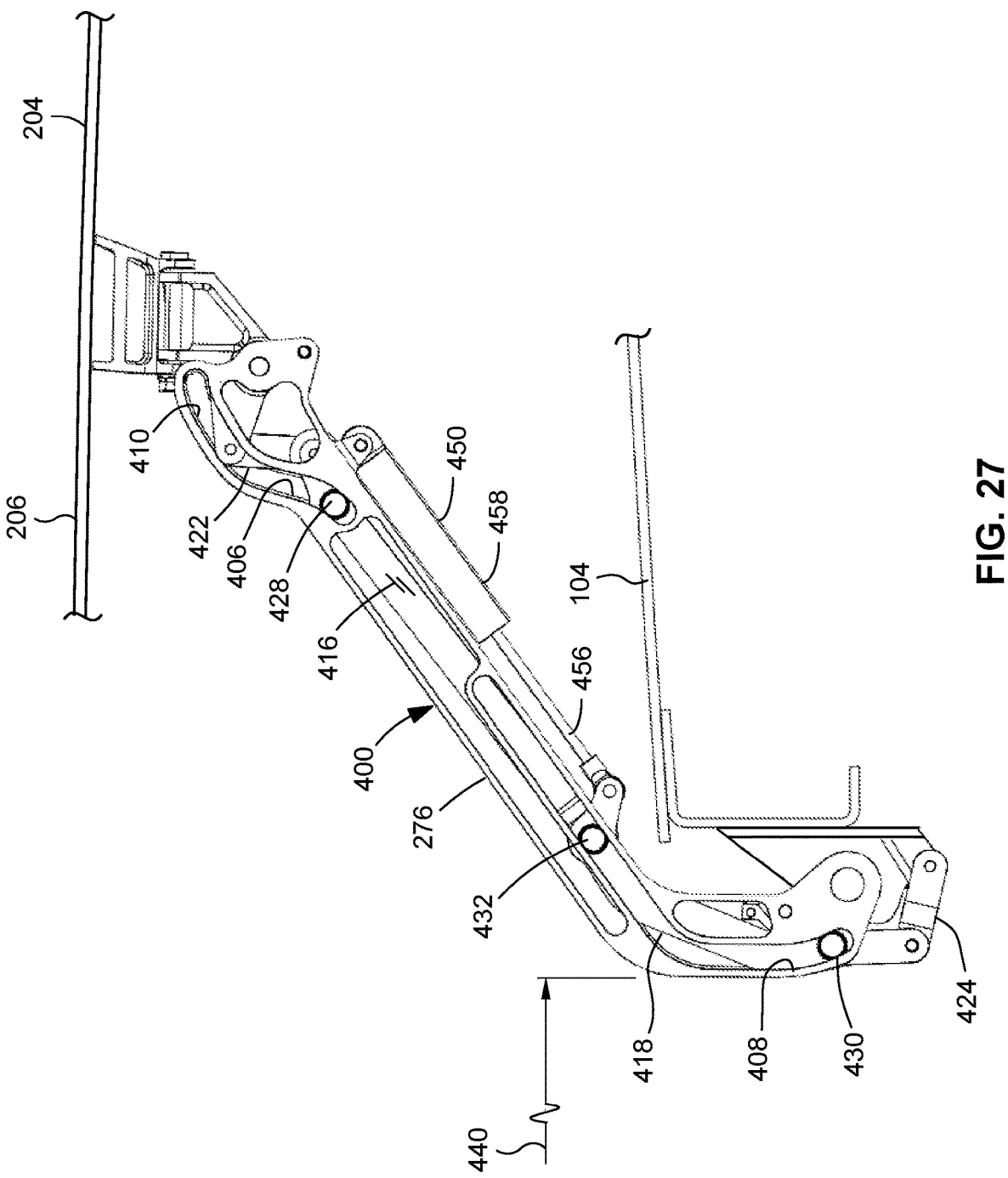
FIG. 27 is a magnified view of the door mechanism of FIG. 26.

FIGS. 24-25 are respectively outboard-looking and inboard-looking views of the door 206 in the open position 204. FIG. 26 is a top-down sectional view of the door assembly 200 when the door 206 is in the open position 204. FIG. 27 is a magnified view of the door assembly 200 showing the orientations of the first and second primary links 416, 418 in relation to the arm 272 (FIG. 25). The first track engaging element 428 and the second track engaging element 430 have moved to the respective ends of the first track 406 and the second track 408, resulting in the reorientation of the first primary link 416 and second primary link 418 relative to their orientations when the door 206 is in the intermediate position (FIG. 23).

In FIG. 27, the directional path shape 410 of the first track 406 and second track 408 is such that when the door 206 is in the open position 204, the link outer profiles of the first primary link 416 and second primary link 418 are within the arm envelope 276. In this regard, no portion of the first primary link 416 or second primary link 418 protrudes into the doorway clearance zone 440, which may be described as the minimum space (e.g., width) through which passengers can easily enter and exit the aircraft 102, including during an evacuation in the event of an emergency. The second primary link 418 has a non-straight shape (e.g., an angled shape) that is complementary to the angled shape of the arm 272 such that when the door 206 is in the open position 204, the second primary link 418 is within the arm envelope 276.

Referring to FIG. 28, shown is an end view of the door 206 in the open position 204 showing the door 206 in a tilted orientation. As mentioned above, the tilted orientation of the door 206 results in an increased distance 236 between the door lower portion 210 and the fuselage 104, relative to a nominal distance 238 between the door lower portion 210 and the fuselage 104 of a conventional door 118 supported by a conventional door mechanism (not shown). The increased distance 236 between the door lower portion 210 and the fuselage 104 allows a larger escape slide 228 to be mounted (i.e., within the slide bustle 226) to the door lower portion 210 without the need to increase the length of the arm 272 (FIG. 4) which would undesirably increase the mass (e.g., weight) of the arm 272.

Referring to FIGS. 29-32, shown are schematic illustrations of the door 206 during different stages of the opening sequence of translating the door 206 from the closed position 202 (FIG. 29) to the open position 204 (FIG. 32). As mentioned above, the mechanical programming system 400 maintains the door 206 generally parallel to the door opening 106 during the opening sequence while allowing non-parallel orientations of the door 206 at one or more points during the opening sequence. In one example, the directional path shape 410 of the tracks is configured such that, during the initial stage of the opening sequence (e.g., within the first 25 percent of the total angular rotation of the door 206 about the arm-door hinge axis 303), one of a door forward end 212 or a door aft end 214 rotates in the outboard 112 direction at a faster rate than the other one of the door forward end 212 or door aft end 214.

For example, FIGS. 29-30 illustrate movement of the door 206 from the closed position 202 (FIG. 29) to an intermediate position (FIG. 30) of the opening sequence after rotation of the arm 272 through an arm angle 436 of approximately 45 degrees about the arm-body hinge axis 294. As shown in FIG. 30, the door 206 is oriented at a positive door angle 438 of approximately 10 degrees (i.e., relative to the door 206 orientation in the closed position 202) such that the door 206 in FIG. 30 is non-parallel to the door opening 106, which means that the door forward end 212 has moved in the outboard 112 direction at a faster rate than the door aft end 214. Such an arrangement (e.g., FIGS. 29-30) of the mechanical programming system 400 may be desirable to provide opening clearance for a door 206 located on a tapered section of the fuselage 104, such as a door 206 in the aft section of the fuselage 104 as shown in FIGS. 2-3, and/or a door 206 in the forward section of the fuselage 104.

FIG. 31 shows the door 206 after rotation of the arm 272 through an arm angle 436 of approximately 135 degrees about the arm-body hinge axis 294. The door 206 is oriented at a door angle 438 of 0 degrees, which means that the door 206 is parallel to the door opening 106. Although FIG. 31 shows the door 206 in an intermediate position of the opening sequence, the directional path shape 410 (FIG. 27)

of the tracks can be configured such that the door 206 in any position, including the open position 204, is parallel to the door 206 in the closed position 202. In still other examples, the directional path shape 410 of the tracks can be configured to cause the door 206 to be parallel to its orientation in the closed position 202 throughout the opening sequence, and is not limited to a parallel orientation of the door 206 at a single intermediate position of the opening sequence or when the door 206 is at the open position 204.

FIG. 32 shows the door 206 after rotation of the arm 272 through an arm angle 436 of approximately 145 degrees. The directional path shape 410 (FIG. 27) of the tracks is configured such that the door 206 in the open position 204 is oriented at a door angle 438 that is non-parallel to the door 206 in the closed position 202 (FIG. 29). In this example, the directional path shape 410 of the tracks is configured such that the orientation of the door 206 in the open position 204 matches the outer contour of the body 100 (e.g., fuselage 104) when viewed from a top-down perspective, and which is beneficial for doors 206 located in tapered sections (e.g., the aft section or forward section) of the fuselage 104. As may be appreciated, the directional path shape 410 of the tracks allows the orientation of the door 206 to be changed at one or more stages of the opening sequence, including at the closed position 204. Changes in the door 206 orientation during the opening sequence are the result of configuring the directional path shape 410 of the tracks in a manner causing the distance between the link connection points respectively at the arm-body interface 290 and the arm-door interface 300 to vary during the opening sequence.

In addition to controlling the orientation of the door 206 during the opening sequence, the directional path shape 410 of the tracks can influence other characteristics of the mechanical programming system 400. For example, the directional path shape 410 of the tracks can be tailored to control or limit the magnitude and/or direction of loads on the components of the mechanical programming system 400 during translation of the door 206 between the closed position 202 and the open position 204. As shown in FIGS. 12 and 17, the directional path shape 410 of the first track 406 and second track 408 includes a concavely-shaped curved section 414 that maintains the end of the first primary link 416 at a distance from the arm-door lower hinge axis 324 during the opening sequence, which has the effect of reducing the magnitude of loads in the first primary link 416 and second primary link 418 during translation of the door 206, relative to increased loads that would otherwise be imposed on the first primary link 416 and second primary link 418 if the end of the first primary link 416 was located nearer to the arm-door lower hinge axis 324. As shown in FIGS. 11-12, the concavely-shaped curved section 414 in the first and second tracks 406, 408 requires a corresponding convexly-shaped portion of the upper track plate 402 and lower track plate 404 near the arm-door interface 300.

Referring now to FIG. 33, shown is a flow chart of a method 500 of controlling the orientation of a door 206 (e.g., an emergency egress door) relative to a body 100 (e.g., a fuselage 104) during an opening sequence of translating the door 206 from a closed position 202 to an open position 204. The method is described in the context of an aircraft 102 as shown in FIGS. 1-32 and described above.

Step 502 of the method 500 includes supporting the door 206 using an arm 272 coupling the door 206 to a side of a door opening 106 in a body 100 in a manner such that the arm 272 is rotatable about an arm-body hinge axis 294 at an arm-body interface 290, and the door 206 is rotatable about an arm-door hinge axis 303 at an arm-door interface 300, as described above. The method 500 initially includes rotating the door operating handle 216 (e.g., manually, via an aircraft crew member) approximately 180 degrees from its closed orientation 218 (FIG. 3) to its open orientation (not shown). As described above, rotating the door operating handle 216 to the open orientation urges the door 206 in a generally upward direction, and simultaneously forces the lift assist mechanism 350 to assist in lifting the door 206 from the closed position 202 (FIG. 18) to the lifted position 358 (FIG. 19).

Step 504 of the method 500 includes rotating the arm 272 about the arm-body hinge axis 294 for moving the door 206 in the outboard 112 direction toward the open position 204. The application of force to rotate the arm 272 about the arm-body hinge axis 294 can be provided by an aircraft crew member, such as a member of the ground crew pulling on the door 206 from outside the aircraft 102, or a member of the flight crew pushing on the door 206 from inside the aircraft 102. In some examples, step 504 of rotating the arm 272 about the arm-body hinge axis 294 can alternatively or additionally include moving the door 206 using a linear actuator 454, either with or without human assistance. In example of FIGS. 11-14 as described above, the linear actuator 454 can be a pneumatic actuator or an electromechanical actuator extending between one of the links and the arm 272. Actuation of the linear actuator 454 causes the track engaging elements to move along the track in a manner moving the door 206 between the closed position 202 and the open position 204. For example, actuation of the linear actuator 454 causes the piston 456 to extend from the cylinder 458, which has the effect of pushing the intermediate track engaging element 432 along the second track 408.

Step 506 of the method 500 includes transmitting rotational motion of the arm 272 to the door 206 via at least two links pivotally connected in series and extending between the arm-body interface 290 and the arm-door interface 300. At least one of the links has at least one track engaging element coupling the link to a track having a directional path shape 410 formed in or coupled to the arm 272. In some examples, step 506 comprises transmitting rotational motion of the arm 272 to the door 206 via at least two links pivotally connected in series and which extend between the arm-body hinge fitting 292 and the door pivot crank 330. As described above, the door pivot crank 330 couples the arm 272 to the door 206 via the trapeze 334. The door pivot crank 330 is rotatable about an axis parallel to the arm-door hinge axis 303.

In the example shown in the figures, step 506 of transmitting rotational motion of the arm 272 to the door 206 comprises transmitting rotational motion via the first primary link 416 and the second primary link 418 which, as described above, are pivotally connected in series at the primary link pin joint 420 which is coupled to the second track 408 at via the intermediate track engaging element 432. As mentioned above, the first primary link 416 is coupled to the first track 406 via the first track engaging element 428 located proximate the door pivot crank 330, and the second primary link 418 is coupled to the second track 408 via the second track engaging element 430 located proximate the arm-body hinge fitting 292.

Step 508 of the method 500 includes changing the orientation of at least one of the links via sliding movement of one or more track engaging elements along the directional path shape 410 of the tracks when transmitting rotational motion of the arm 272 to the door 206 via the at least two links in a manner maintaining the door 206 generally parallel to the door opening 106 during the opening sequence while allowing non-parallel orientations of the door 206 at one or more points during the opening sequence. In some examples, step 508 of the changing the orientation of the links comprises changing the orientation of at least one of the links via movement of the one or more track engaging elements along the directional path shape 410 of the track in a manner such that when the door 206 is in the open position 204, at least one of the links is within the arm envelope 276 defined by the arm outer surfaces 274. For example, FIG. 27 shows the door 206 in the open position 204 and the first primary link 416 and second primary link 418 are within the arm envelope 276. By keeping the first and second primary links 416, 418 within the arm envelope 276, the doorway clearance zone 440 remains unobstructed, thereby allowing passengers to easily enter and exit the aircraft 102.

In some examples, step 508 of the method comprises changing the orientation of at least one of the links via movement of the track engaging element along the directional path shape 410 of the tracks in a manner such that, during an initial stage of the opening sequence, either the door forward end 212 or the door aft end 214 rotates in an outboard 112 direction at a faster rate than the other one of the door forward end 212 or door aft end 214. For example, FIGS. 29-30 show the initial stage of the door 206 moving from the closed position 202 to an intermediate position of the opening sequence. FIG. 30 shows the door 206 oriented at a positive door angle 438 of approximately 10 degrees relative to its orientation in the closed position 202, and which corresponds to movement of the door forward end 212 in the outboard 112 direction at a faster rate than the door aft end 214. However, in another example not shown, step 508 can comprise changing the orientation of the links in a manner such that the door aft end 214 rotates in the outboard 112 direction at a faster rate than the door forward end 212.

In some examples, step 508 comprises changing the orientation of the links via movement of the track engaging element along the directional path shape 410 of the track in a manner such that the door 206 in the open position 204 is parallel to the door 206 in the closed position 202. Although FIG. 31 shows the door 206 in an intermediate position in which the door 206 is oriented parallel to its orientation in the closed position 202, the directional path shape 410 of the tracks can be configured such that the door 206 in any position, including an intermediate position, is parallel to the door 206 in the closed position 202.

In some examples, step 508 of the method comprises changing the orientation of at least one of the links via movement of the track engaging element along the directional path shape 410 of the tracks in a manner such that the door 206 in the open position 204 is non-parallel to the door 206 in the closed position 202. In FIG. 32, the door 206 is oriented at a door angle 438 that is non-parallel to the door 206 in the closed position 202. The door 206 orientation in FIG. 32 matches the outer contour of the fuselage 104 which, as mentioned above, is beneficial in certain locations on the aircraft 102, such as in tapered sections of the fuselage 104 such as in the aft section or forward section.

In any one of the above-described examples, the method can include dampening rotational inertia of the door 206 relative to the arm 272 during translation of the door 206 between the closed position 202 and the open position 204. Dampening of the inertia of the door 206 can be performed using a damper 450 as shown in FIGS. 11-14. As described above, the damper 450 extends between one of the links (e.g., a link tab 452) and the arm 272. As shown in FIG. 27, the damper 450 can include a piston 456 that is slidable within a cylinder 458 configured to dampen the inertia of the door 206 during the opening sequence and/or the closing sequence.

Advantageously, the presently-disclosed mechanical programming system 400 has a reduced cost, weight, and/or complexity relative to conventional programming systems. For example, the presently-disclosed mechanical programming system 400 eliminates the need for structural interfaces that are otherwise required at the door 206 and at the door opening 106 for a parallel bars programming system (not shown). In addition, the presently-disclosed mechanical programming system 400 weighs less than a rack-and-pinion programming system that uses heavy rack and pinion gears. Furthermore, the presently-disclosed mechanical programming system 400 is less costly than a chain drive programming system which typically requires sprockets that have teeth formed of hardened material. In addition to the above noted advantages of reduced cost, weight, and/or complexity, the presently-disclosed mechanical programming system 400 takes up less space than conventional programming systems. Furthermore, retrofitting or integrating the presently-disclosed mechanical programming system 400 into existing double-acting door hinges is relatively straightforward.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A mechanical programming system for a door, comprising:

at least one track formed in an arm configured to couple the door to a side of a door opening in a body in a manner such that the arm is rotatable about an arm-body hinge axis at an arm-body interface and the door is rotatable about an arm-door hinge axis at an arm-door interface, and the arm has arm outer surfaces defining an arm envelope;

at least two links pivotably connectable in series and extendable between the arm-body interface and the arm-door interface and configured to transmit rotational motion of the arm about the arm-body hinge axis to the door for rotation about the arm-door hinge axis, and at least one of the links has two track engaging elements that are non-coaxial and configured to couple the link to the at least one track; and wherein the at least one track has a directional path shape configured to cause an orientation of the link having the two track engaging elements to change as the two track engaging elements slide along the at least one track in a manner maintaining the door generally parallel to the door opening during an opening sequence of translating the door from a closed position to an open position while allowing non-parallel orientations of the door at one or more points during the opening sequence, and the directional path shape is configured such that the link having the two track engaging elements is within the arm envelope during at least a portion of the opening sequence.

2. The mechanical programming system of claim 1, wherein:

the directional path shape of the at least one track is configured such that when the door is in the open position, the at least two links are within the arm envelope.

3. The mechanical programming system of claim 1, wherein:

the directional path shape of the at least one track is configured such that the door in the open position is parallel to the door in the closed position.

4. The mechanical programming system of claim 1, wherein:

the directional path shape of the at least one track is configured such that the door in the open position is non-parallel to the door in the closed position.

5. The mechanical programming system of claim 1, wherein:

the door has a door forward end and a door aft end; and
the directional path shape is configured such that, during an initial stage of the opening sequence, one of the door forward end or the door aft end rotates at a faster rate than the other.

6. The mechanical programming system of claim 1, further comprising:

a damper extending between one of the links and the arm and configured to dampen rotational inertia of the door relative to the arm during translation of the door between the closed position and the open position.

7. The mechanical programming system of claim 1, further comprising:

a linear actuator extending between one of the links and the arm, and configured to move the two track engaging elements along the at least one track in a manner moving the door between the closed position and the open position.

8. The mechanical programming system of claim 1, wherein the at least two links include:

a first primary link and a second primary link pivotably connectable to each other at a primary link pin joint that is couplable to the at least one track via the at least one of the two track engaging elements;
the first primary link is pivotably connectable to a door pivot crank configured to couple the arm to the door at the arm-door interface and which is rotatable about an axis parallel to the arm-door hinge axis; and
the second primary link is pivotably connectable to an arm-body hinge fitting that is coupled to the door opening and through which the arm-body hinge axis passes.

9. The mechanical programming system of claim 8, wherein:

the first primary link includes a first track engaging element configured to couple the first primary link to the at least one track at a location proximate the door pivot crank;
the second primary link includes a second track engaging element configured to couple the second primary link to the at least one track at a location proximate the arm-body hinge fitting; and
the primary link pin joint is couplable to the at least one track via an intermediate track engaging element located between the first track engaging element and the second track engaging element.

10. An aircraft, comprising:

a fuselage having a door opening and a cabin door;
an arm coupling the cabin door to a side of the door opening in a manner such that the arm is rotatable about an arm-body hinge axis at an arm-body interface and the cabin door is rotatable about an arm-door hinge axis at an arm-door interface, and the arm has arm outer surfaces defining an arm envelope;
a mechanical programming system, comprising:

at least one track formed in the arm;
at least two links pivotably connected in series and extending between the arm-body interface and the arm-door interface and configured to transmit rotational motion of the arm about the arm-body hinge axis to the cabin door for rotation about the arm-door hinge axis, and at least one of the links has two track engaging elements that are non-coaxial and configured to engage the link with the at least one track; and wherein the at least one track has a directional path shape configured to cause an orientation of the link having the two track engaging elements to change as the two track engaging elements slide along the at least one track in a manner maintaining the cabin door generally parallel to the door opening during an opening sequence of translating the cabin door from a closed position to an open position while allowing non-parallel orientations of the cabin door at one or more points during the opening sequence, and the directional path shape is configured such that the link having the two track engaging elements is within the arm envelope during at least a portion of the opening sequence.

11. The aircraft of claim 10, wherein:

the directional path shape of the at least one track is configured such that when the cabin door is in the open position, the at least two links are within the arm envelope to thereby maintain a doorway clearance zone.

12. A method of controlling an orientation of a door relative to a body during an opening sequence of translating the door from a closed position to an open position, comprising:

supporting a door using an arm coupling the door to a side of a door opening in a body in a manner such that the arm is rotatable about an arm-body hinge axis at an arm-body interface and the door is rotatable about an arm-door hinge axis at an arm-door interface, and the arm has arm outer surfaces defining an arm envelope;
rotating the arm about the arm-body hinge axis;
transmitting rotational motion of the arm to the door via at least two links pivotally connected in series and extending between the arm-body interface and the arm-door interface, and at least one of the links has two track engaging elements that are non-coaxial and which couple the link to at least one track having a directional path shape formed in the arm; and
changing an orientation of at least one of the links via sliding movement of the two track engaging elements along the directional path shape of the at least one track when transmitting rotational motion of the arm to the door via the at least two links in a manner maintaining the door generally parallel to the door opening during the opening sequence while allowing non-parallel orientations of the door at one or more points during the opening sequence, and such that the link having the two track engaging elements is within the arm envelope during at least a portion of the opening sequence.

13. The method of claim 12, wherein changing the orientation of at least one of the links comprises:

changing the orientation of at least one of the links via movement of the track engaging element along the directional path shape of the at least one track in a manner such that when the door is in the open position, the at least two links are within the arm envelope.

14. The method of claim 12, wherein changing the orientation of at least one of the links comprises:

changing the orientation of at least one of the links via movement of the track engaging element along the directional path shape of the at least one track in a manner such that the door in the open position is parallel to the door in the closed position.

15. The method of claim 12, wherein changing the orientation of at least one of the links comprises:

changing the orientation of at least one of the links via movement of the track engaging element along the directional path shape of the at least one track in a manner such that the door in the open position is non-parallel to the door in the closed position.

16. The method of claim 12, wherein changing the orientation of at least one of the links comprises:

changing the orientation of at least one of the links via movement of the track engaging element along the directional path shape of the at least one track in a manner such that, during an initial stage of the opening sequence, one of a door forward end or a door aft end rotates in an outboard direction at a faster rate than the other one of the door forward end or door aft end.

17. The method of claim 12, further comprising:

dampening rotational inertia of the door relative to the arm during translation of the door between the closed position and the open position using a damper extending between one of the links and the arm.

18. The method of claim 12, wherein rotating the arm about the arm- body hinge axis comprises:

moving, using a linear actuator extending between one of the links and the arm, the two track engaging elements along the at least one track in a manner moving the door between the closed position and the open position.

19. The method of claim 12, wherein transmitting rotational motion of the arm to the door comprises:

transmitting rotational motion of the arm to the door via the at least two links pivotally connected in series and which extend between an arm-body hinge fitting at the arm-body interface and a door pivot crank at the arm-door interface.

20. The method of claim 19, wherein transmitting rotational motion of the arm to the door comprises:

transmitting rotational motion of the arm to the door via a first primary link and a second primary link pivotally connected in series at a primary link pin joint coupled to the at least one track at via an intermediate track engaging element; and wherein the first primary link is coupled to the at least one track via a first track engaging element located proximate the door pivot crank, and the second primary link is coupled to the at least one track via a second track engaging element located proximate the arm-body hinge fitting.

* * * * *